United States Patent
Tomita et al.

(10) Patent No.: US 8,792,236 B2
(45) Date of Patent: Jul. 29, 2014

(54) ELECTRONIC APPARATUS

(75) Inventors: Takahiro Tomita, Nagano (JP);
Takahiro Totuka, Nagano (JO);
Tomoyuki Tsukamoto, Nagano (JP);
Yasunori Kimura, Nagano (JP); Tatsu Kataoka, Nagano (JP); Takanori Takei, Nagano (JP)

(73) Assignee: Sony Corporation, Tokyo (JP)

( * ) Notice: Subject to any disclaimer, the term of this patent is extended or adjusted under 35 U.S.C. 154(b) by 68 days.

(21) Appl. No.: 13/445,045

(22) Filed: Apr. 12, 2012

(65) Prior Publication Data

US 2012/0268880 A1 Oct. 25, 2012

(30) Foreign Application Priority Data

Apr. 22, 2011 (JP) .................... 2011-095789

(51) Int. Cl.
*G06F 1/16* (2006.01)
(52) U.S. Cl.
USPC .............. 361/679.56; 361/679.59; 455/575.3; 455/575.4; 455/575.8
(58) Field of Classification Search
USPC .............. 361/679.02, 679.27, 679.55, 679.56, 361/679.59; 455/575.1–575.4, 575.8
See application file for complete search history.

(56) References Cited

U.S. PATENT DOCUMENTS

| 4,742,478 | A | * | 5/1988 | Nigro et al. | 361/679.09 |
| 4,858,162 | A | * | 8/1989 | Kieffer et al. | 361/679.41 |
| 5,175,672 | A | * | 12/1992 | Conner et al. | 361/679.09 |
| 5,251,102 | A | * | 10/1993 | Kimble | 361/679.09 |
| 5,594,617 | A | * | 1/1997 | Foster et al. | 361/679.02 |
| 5,642,258 | A | * | 6/1997 | Barrus et al. | 361/679.59 |
| D392,259 | S | * | 3/1998 | Simmon | D14/341 |
| 5,768,100 | A | * | 6/1998 | Barrus et al. | 361/679.41 |
| 5,808,862 | A | * | 9/1998 | Robbins | 361/679.09 |
| D436,951 | S | * | 1/2001 | Andresen | D14/336 |
| 6,191,941 | B1 | * | 2/2001 | Ito et al. | 361/679.27 |
| 6,233,141 | B1 | * | 5/2001 | Lee et al. | 361/679.57 |
| D457,857 | S | * | 5/2002 | Ogasawara | D13/103 |
| 6,385,039 | B1 | * | 5/2002 | Chiang et al. | 361/679.09 |
| 6,452,795 | B1 | * | 9/2002 | Lee | 361/679.41 |
| 6,535,378 | B1 | * | 3/2003 | Oguchi et al. | 361/679.55 |
| 6,560,100 | B1 | * | 5/2003 | Shin et al. | 361/679.41 |
| 6,768,637 | B1 | * | 7/2004 | Amemiya | 361/679.55 |
| 6,831,229 | B1 | * | 12/2004 | Maatta et al. | 174/66 |
| 6,894,893 | B2 | * | 5/2005 | Hidesawa | 361/679.55 |
| 6,903,927 | B2 | * | 6/2005 | Anlauff | 361/679.28 |
| 6,930,881 | B2 | * | 8/2005 | Karidis et al. | 361/679.55 |
| 6,956,734 | B2 | * | 10/2005 | Shin et al. | 361/679.55 |
| 6,975,890 | B2 | * | 12/2005 | Wu et al. | 455/575.1 |
| D514,098 | S | * | 1/2006 | Huang et al. | D14/315 |
| 7,106,579 | B2 | * | 9/2006 | Maskatia et al. | 361/679.28 |
| 7,199,999 | B2 | * | 4/2007 | Shin et al. | 361/679.55 |

(Continued)

FOREIGN PATENT DOCUMENTS

| JP | 11327684 A | * | 11/1999 | G06F 1/16 |
| JP | 2010-157441 | | 7/2010 | |

*Primary Examiner* — Adrian S Wilson
(74) *Attorney, Agent, or Firm* — Sony Corporation

(57) ABSTRACT

There is provided an electronic apparatus, including a cabinet having a display surface exposed to an outside, a battery provided at the bottom on an opposite side of the display surface in the cabinet and at least a portion of the battery protruding to an outer side from the bottom, and a height formed at the edge of the cabinet so as to protrude to the outer side to cover the battery.

14 Claims, 22 Drawing Sheets

(56) References Cited

U.S. PATENT DOCUMENTS

| | | | |
|---|---|---|---|
| 7,345,872 B2 * | 3/2008 | Wang | 361/679.55 |
| D580,850 S * | 11/2008 | Iseki | D13/103 |
| 7,492,891 B2 * | 2/2009 | Eldon | 379/433.12 |
| 7,502,222 B2 * | 3/2009 | Cheng et al. | 361/679.55 |
| D603,330 S * | 11/2009 | Iseki | D13/103 |
| 7,667,959 B2 * | 2/2010 | Pelkonen | 361/679.27 |
| D621,829 S * | 8/2010 | Cheng | D14/327 |
| 8,133,603 B2 * | 3/2012 | Moon | 429/100 |
| 8,172,282 B2 * | 5/2012 | Lev et al. | 292/164 |
| 8,295,039 B2 * | 10/2012 | Cheng et al. | 361/679.26 |
| 2004/0240689 A1 * | 12/2004 | Miyamoto | 381/306 |
| 2005/0059283 A1 * | 3/2005 | Lo | 439/296 |
| 2005/0110761 A1 * | 5/2005 | Minaguchi et al. | 345/168 |
| 2006/0133021 A1 * | 6/2006 | Fan | 361/683 |
| 2009/0190295 A1 * | 7/2009 | Chin et al. | 361/679.27 |
| 2010/0048268 A1 * | 2/2010 | O'Neill et al. | 455/575.8 |
| 2011/0122556 A1 * | 5/2011 | Cheng et al. | 361/679.01 |
| 2012/0019993 A1 * | 1/2012 | Ou et al. | 361/679.01 |

* cited by examiner

A-A SECTIONAL VIEW

B-B SECTIONAL VIEW

C-C SECTIONAL VIEW

D-D SECTIONAL VIEW

ELECTRONIC APPARATUS

BACKGROUND

The present disclosure relates to an electronic apparatus, and in particular, relates to an electronic apparatus that can easily be gripped by a user.

As electronic apparatuses, for example, mobile information terminals such as PDAs and information apparatuses such as mobile PCs are commonly used.

In recent years, the above electronic apparatuses having portability have become smaller in size. Thus, when the user carries such an electronic apparatus, it is assumed that the electronic apparatus is gripped with one hand (see Japanese Patent Application Laid-Open No. 2010-157441).

SUMMARY

The shape of the above electronic apparatuses is generally a thin plane shape. If the shape of an electronic apparatus is plane, the surface thereof may be slippery or it is difficult to grip the electronic apparatus. Thus, it is difficult for the user to carry the electronic apparatus while gripping the apparatus with one hand.

The present disclosure proposes a novel, improved electronic apparatus that can easily be gripped by the user with one hand.

According to an embodiment of the present disclosure, there is provided an electronic apparatus, including a cabinet having a display surface exposed to an outside, a battery provided at the bottom on an opposite side of the display surface in the cabinet and at least a portion of the battery protruding to an outer side from the bottom, and a height formed at the edge of the cabinet so as to protrude to the outer side to cover the battery.

According to the present disclosure described above, an electronic apparatus can easily be gripped by the user with one hand.

DETAILED DESCRIPTION OF THE EMBODIMENT

Figure 1:
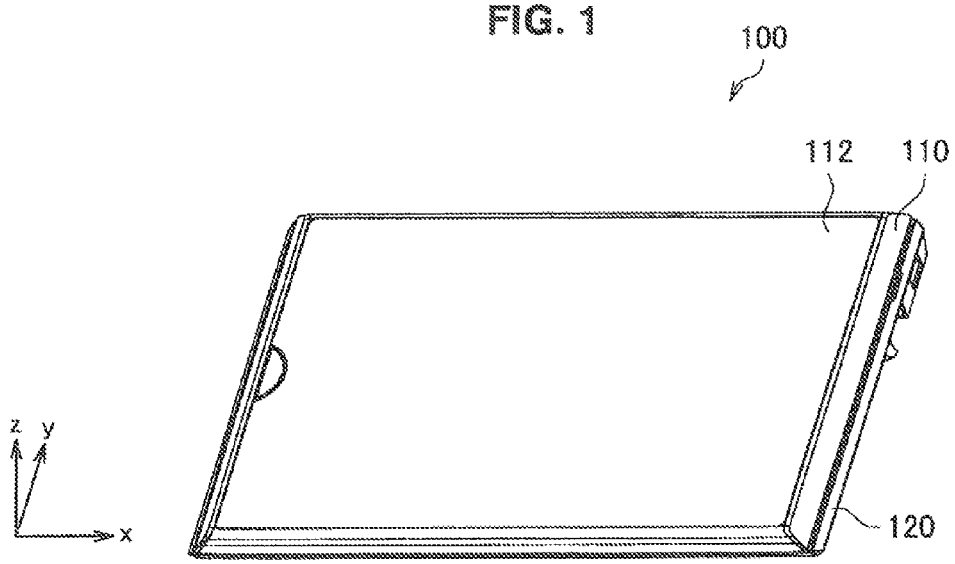
FIG. 1 is a schematic perspective view showing a default state of an electronic apparatus 100.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be provided in the following order:
1. Configuration of Electronic Apparatus
2. Detailed Configuration of Body Cabinet
3. Detailed Configuration of Speaker Unit
4. Protective Cover
5. Conclusion <1. Configuration of Electronic Apparatus>
(Outline Configuration of the Electronic Apparatus)

Figure 2:
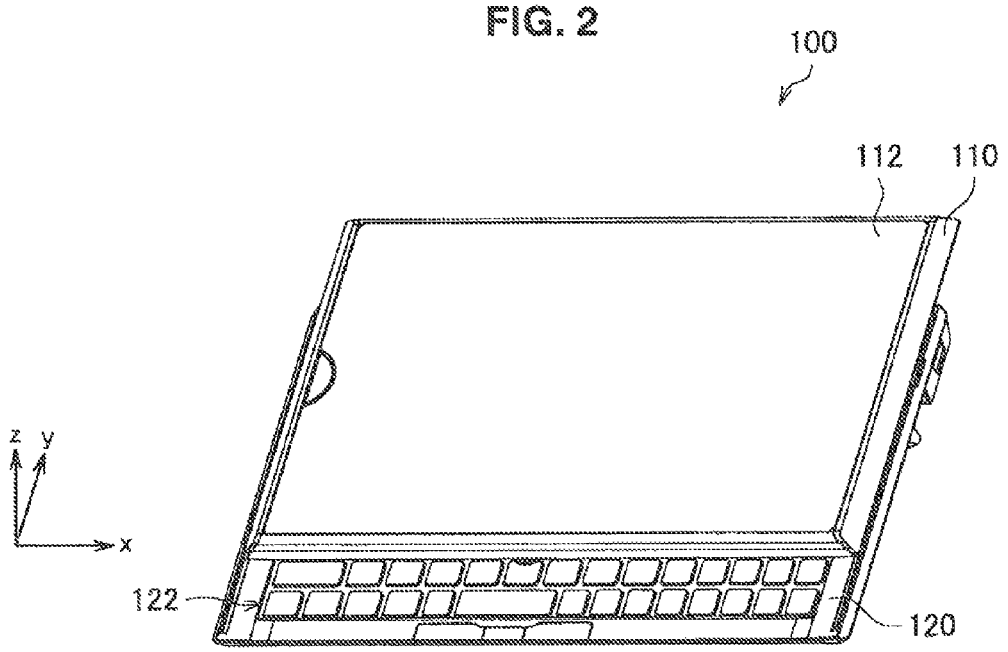
FIG. 2 is a schematic perspective view showing a sliding state of the electronic apparatus 100.
Figure 3:
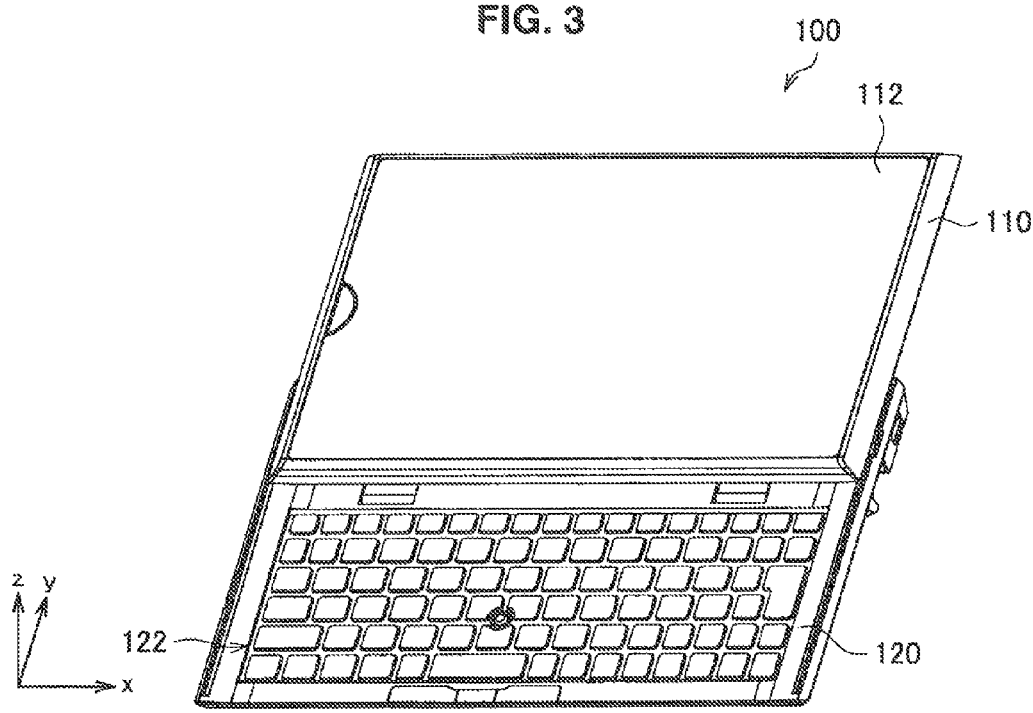
FIG. 3 is a schematic perspective view showing a slide complete state of the electronic apparatus 100.
Figure 4:
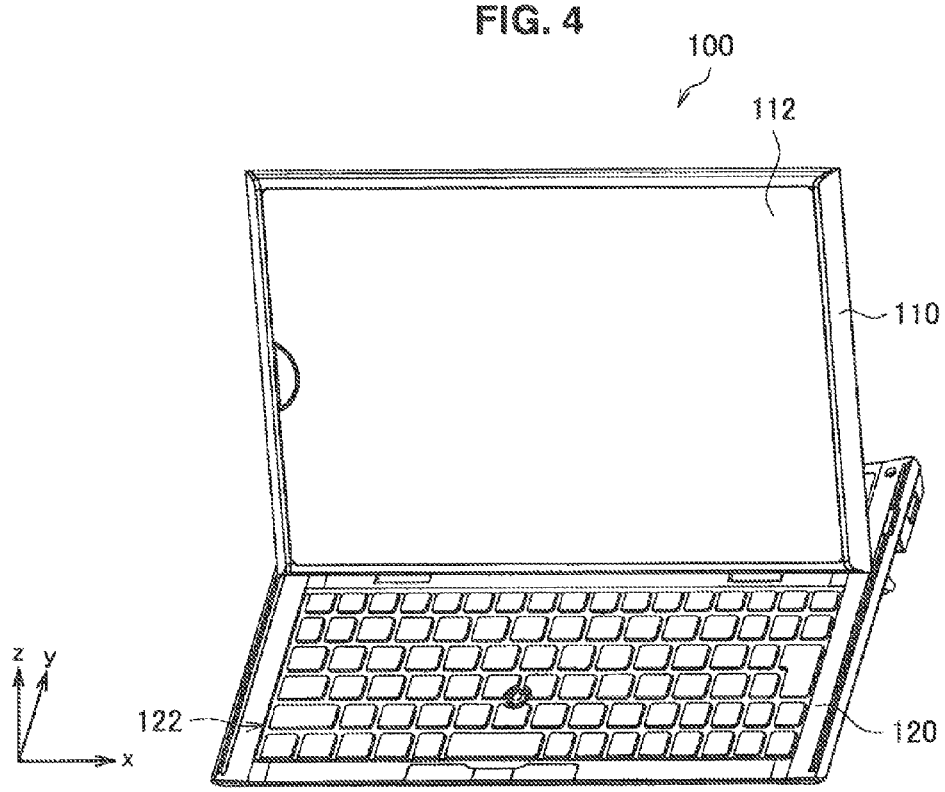
FIG. 4 is a schematic perspective view showing a tilted state of the electronic apparatus 100.

An outline configuration of the electronic apparatus 100 according to the present embodiment will be described with reference to FIGS. 1 to 4. FIG. 1 is a schematic perspective view showing a default state of the electronic apparatus 100. FIG. 2 is a schematic perspective view showing a sliding state of the electronic apparatus 100. FIG. 3 is a schematic perspective view showing a slide complete state of the electronic apparatus 100. FIG. 4 is a schematic perspective view showing a tilted state of the electronic apparatus 100.

As shown in FIGS. 1 to 4, the electronic apparatus 100 has a display cabinet 110 including a display unit 112 and a body cabinet 120 including a keyboard 122 containing a plurality of keys connected movably. The display cabinet 110 and the body cabinet 120 each have, for example, a plane shape and are formed in the same size. In the present embodiment, the body cabinet 120 corresponds to a first cabinet and the display cabinet 110 corresponds to a second cabinet. The keyboard 122 corresponds to an input portion.

In a closed state (corresponding to the initial state) of the electronic apparatus 100, as shown in FIG. 1, the display cabinet 110 and the body cabinet 120 are provided in such a way that the display cabinet 110 is positioned on the body cabinet 120. That is, the display cabinet 110 and the body cabinet 120 are in a state stacked in the z direction. At this point, the display cabinet 110 is provided relative to the body cabinet in such a way that the display unit 112 provided in the display cabinet 110 is on an outer side of the apparatus (that is, on the opposite side of the side opposed to the body cabinet 120). Therefore, even in a default state in which the electronic apparatus 100 is closed, the user can visually recognize information such as content displayed in the display unit 112.

The display cabinet 110 and the body cabinet 120 are connected by a slide mechanism (not shown) movably in a predetermined slide direction. In the present embodiment, as shown in FIG. 2, the display cabinet 110 is enabled by the slide mechanism to slide in the y direction, which is the slide direction with respect to the body cabinet 120. If the display cabinet 110 is slid in the positive y direction, a portion of the body cabinet 120 is exposed. As shown in FIGS. 2 and 3, the keyboard 122 is provided in a region of the body cabinet 120 exposed by the display cabinet 110 being slid. If the display cabinet 110 is slid to the maximally movable position, as shown in FIG. 3, the whole keyboard 122 provided in the body cabinet 120 appears, making the keyboard 122 ready for use.

Further, the electronic apparatus 100 includes a hinge mechanism that makes the display cabinet 110 and the body cabinet 120 rotatable. When the slide complete state shown in FIG. 3 is reached, as shown in FIG. 4, the hinge mechanism can enable the display cabinet 110 to rotate with respect to the body cabinet 120. The user rotates the display cabinet 110 to make adjustments to make the display unit 112 easier to view so that the user can use the electronic apparatus 100 like a notebook personal computer.

If a touch sensor (not shown) is included in a region corresponding to the display unit 112 (display surface) of the display cabinet 110 by being superimposed, an operation in the electronic apparatus 100 can be input by causing an operation body such a finger to touch the display unit 112 in the default state shown in FIG. 1. If it is easier to input information like text input or the like using the keyboard 122 than the above, as shown in FIGS. 2 to 4, operation input can be done from the keyboard 122 by sliding the display cabinet 110 relative to the body cabinet 120. At this point, the operation input can be made easier by rotating the display cabinet 110.

While the electronic apparatus 100 according to the present embodiment can, as described above, change the form thereof by the slide mechanism and the hinge mechanism, these mechanisms are configured to be easily changed in form and to enhance a using feeling and operability of the apparatus.

(Usage Form of the Electronic Apparatus)

Though the electronic apparatus 100 according to the present embodiment can be used in a state in which the electronic apparatus 100 is held by the user in the default state, the electronic apparatus 100 can be used in a state in which the electronic apparatus 100 is placed on a mounting surface like a table.

Figure 5:
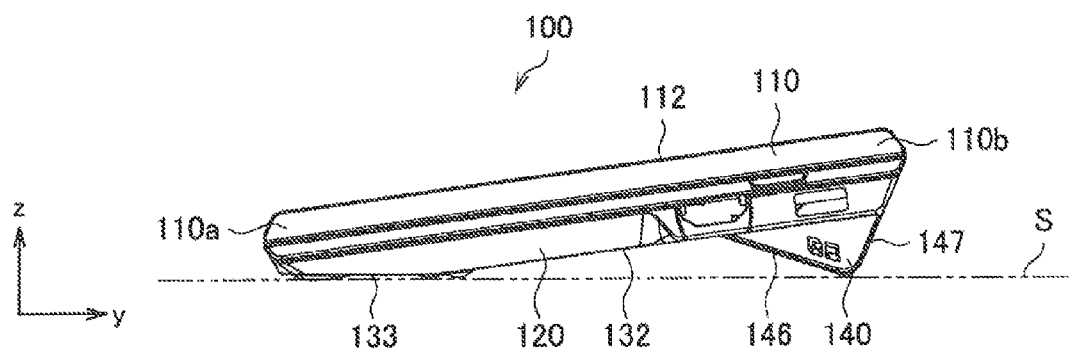
FIG. 5 is a side view showing the electronic apparatus 100 in the default state placed on a mounting surface S.
Figure 6:
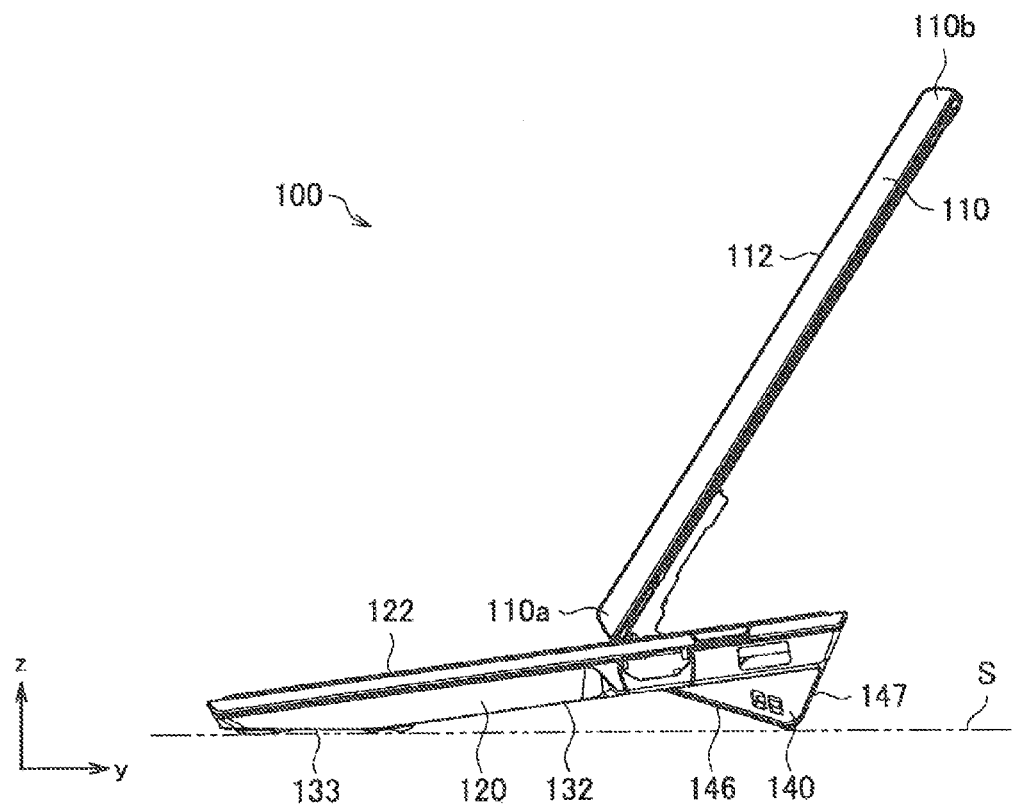
FIG. 6 is a side view showing the electronic apparatus 100 in the tilted state placed on the mounting surface S.

The usage form of the electronic apparatus 100 placed on a mounting surface will be described below with reference to FIGS. 5 and 6. FIG. 5 is a side view showing the electronic apparatus 100 in the default state placed on the mounting surface S. FIG. 6 is a side view showing the electronic apparatus 100 in the tilted state placed on the mounting surface S.

As shown in FIGS. 5 and 6, the electronic apparatus 100 is placed on the mounting surface S by a bottom 132 of the body cabinet 120 being brought into contact with the mounting surface S. More specifically, one end 133 of the bottom 132 of the body cabinet 120 in a transverse direction and a height 140 formed on the side of the other end come into contact with the mounting surface S. A detailed configuration at the bottom 132 of the body cabinet 120 including the height 140 will be described later.

If, as shown in FIG. 5, the electronic apparatus 100 is placed on the mounting surface S in the default state, operation input can be done to a display screen displayed in the display unit 112 through the touch panel. Because the height 140 is in contact with the mounting surface S, the electronic apparatus 100 is placed in an inclined state with respect to the mounting surface S. Thus, the display unit 112 is inclined with respect to the mounting surface S (tilted facing the user) in the default state, which makes it easier for the user to view the display unit 112. Similarly, it becomes easier for the user to do operation input through the touch panel.

If, as shown in FIG. 6, the electronic apparatus 100 is placed on the mounting surface S in the tilted state, operation input can be done to a display screen displayed in the display unit 112 through the keyboard 122. The keyboard 122 is inclined with respect to the mounting surface S (inclined facing the user) in the tilted state, which makes it easier for the user to do operation input through the keyboard 122. Moreover, because the body cabinet 120 is inclined, the angle of inclination of the display cabinet 110 with respect to the mounting surface S can be increased even if the tilt angle (angle in a tilted state) of the display cabinet 110 with respect to the body cabinet 120 is small. By decreasing the tilt angle as described above, the amount of overlapping of the display cabinet 110 with the arrangement surface (operation surface) of the keyboard 122 when the display cabinet 110 is tilted can be reduced. As a result, the region that can be used as the keyboard 122 can be increased on the operation surface and thus, the arrangement space of the keyboard 122 can be secured even if the electronic apparatus 100 is reduced in size.

In the foregoing, the default state and the tilted state of the electronic apparatus 100 have been described, but the operation input can be done to the display screen displayed in the display unit 112 by the keyboard 122 even if a state in which the electronic apparatus 100 in the slide state in FIG. 3 is placed on the mounting surface S.

Incidentally, the electronic apparatus 100 according to the present embodiment is configured to be portable not only in the default state, but also in the tilted state. Thus, the body cabinet 120 includes an uneven portion 126 to make it easier for the user to carry the electronic apparatus 100 in the tilted state.

Figure 7:
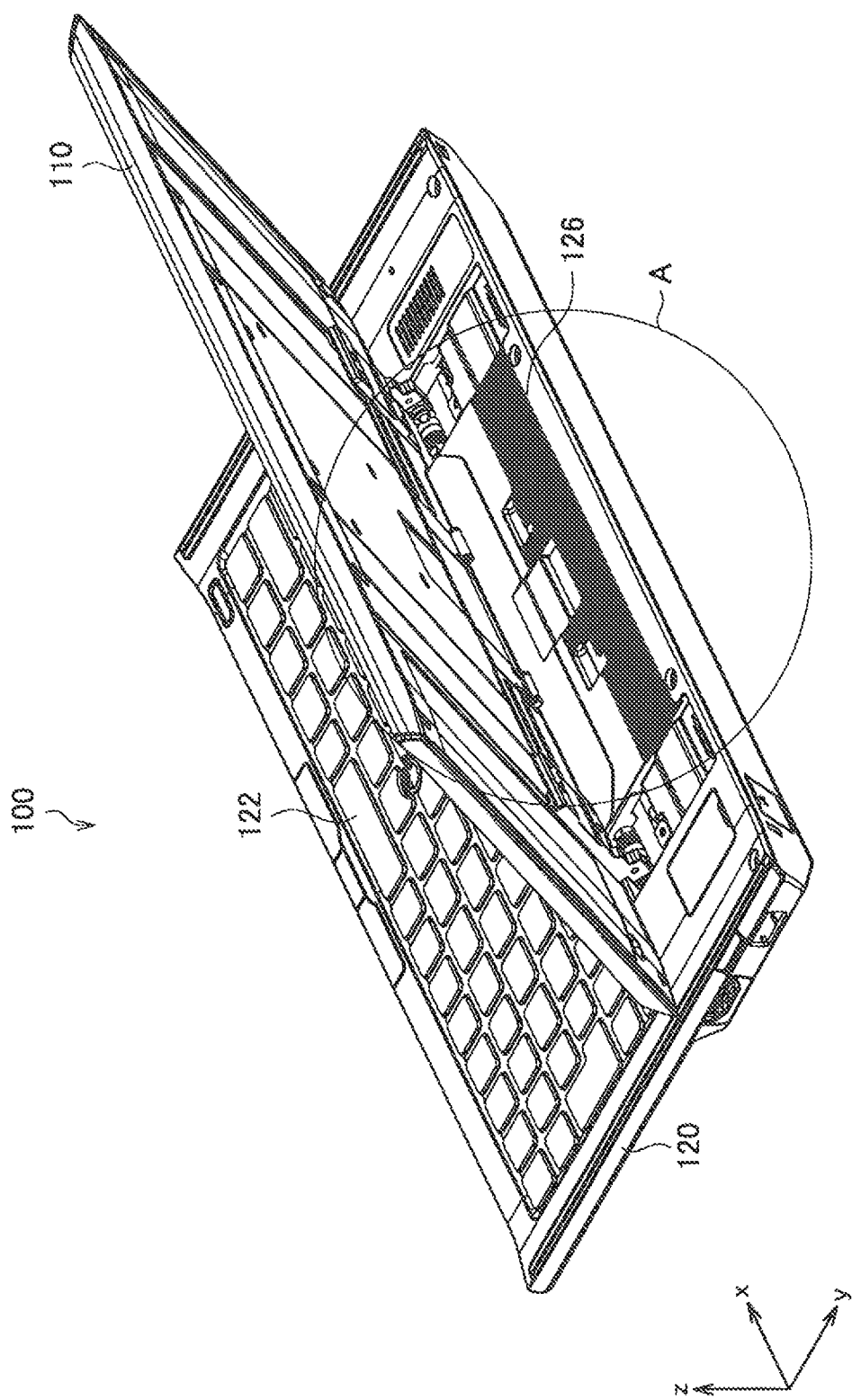
FIG. 7 is a perspective view showing a back side of the electronic apparatus 100 in the tilted state.
Figure 8:
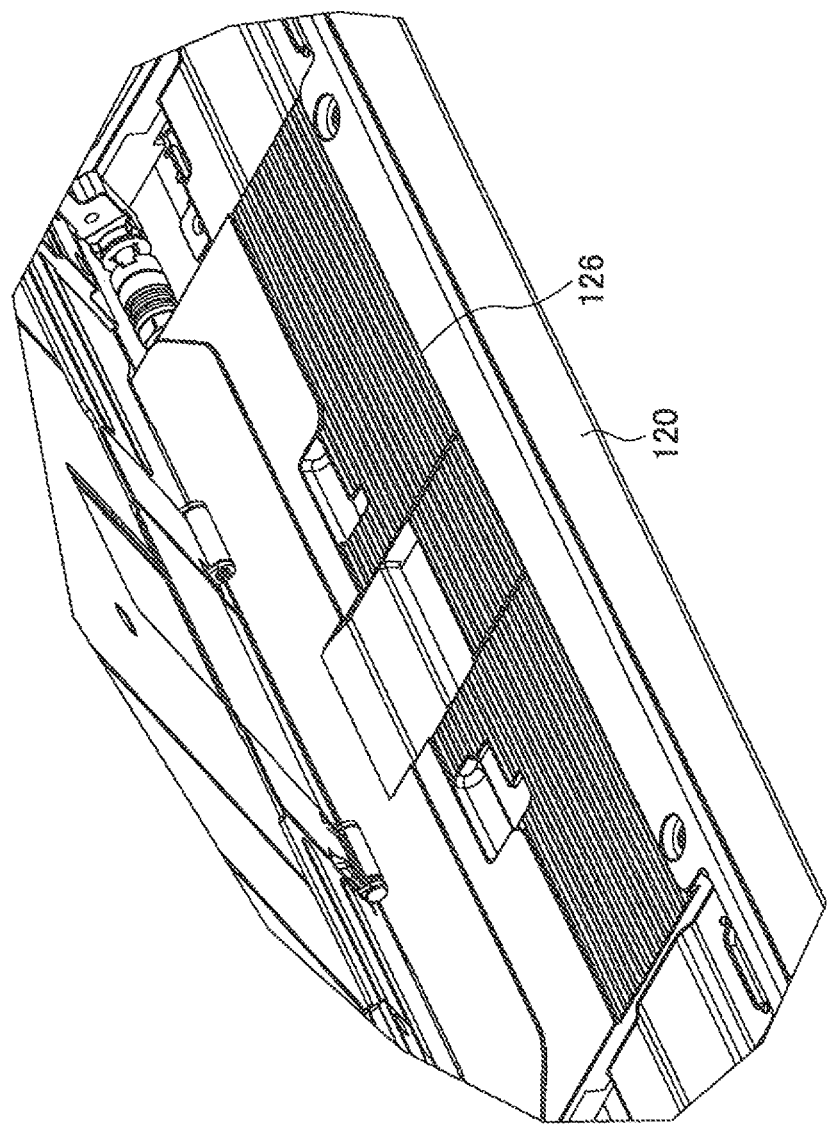
FIG. 8 is an enlarged view enlarging a portion A in FIG. 7.

The uneven portion 126 will be described with reference to FIGS. 7 and 8. FIG. 7 is a perspective view showing a back side of the electronic apparatus 100 in the tilted state. FIG. 8 is an enlarged view enlarging a portion A in FIG. 7.

As shown in FIGS. 7 and 8, the body cabinet 120 has the uneven portion 126 on the back side of the front side on which the keyboard 122 is arranged. The uneven portion 126 is a portion gripped by, for example, a thumb when the user carries the electronic apparatus 100 in the tilted state. The uneven portion 126 is formed unevenly like, for example, a pattern and has a skid function when the user grips the electronic apparatus 100 with one hand (see FIG. 13). Thus, the electronic apparatus 100 in the tilted state can be made more portable by the uneven portion 126 being gripped by the user.

<2. Detailed Configuration of Body Cabinet>

Figure 9:
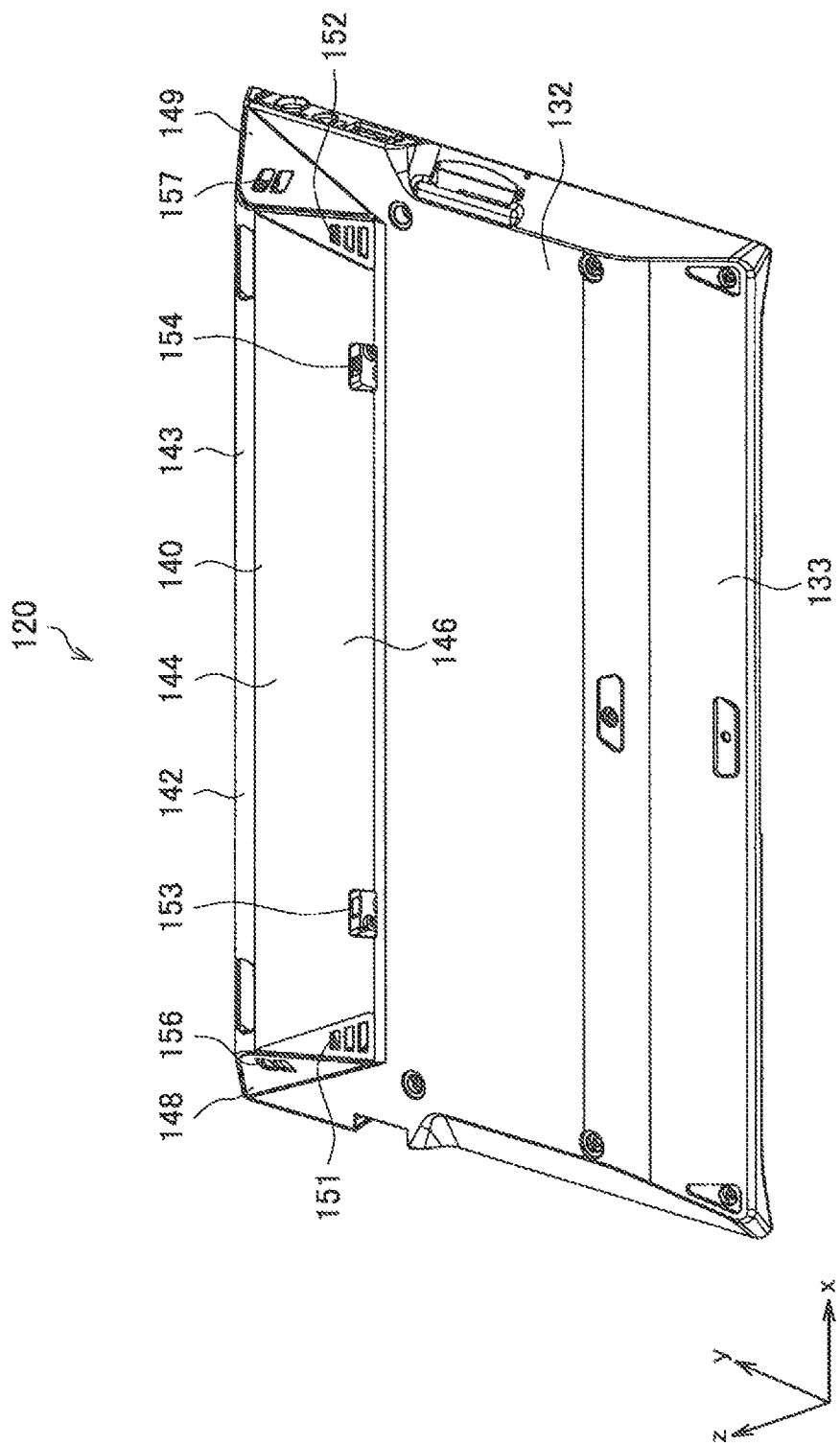
FIG. 9 is a perspective view showing a bottom side of a body cabinet 120.
Figure 10:
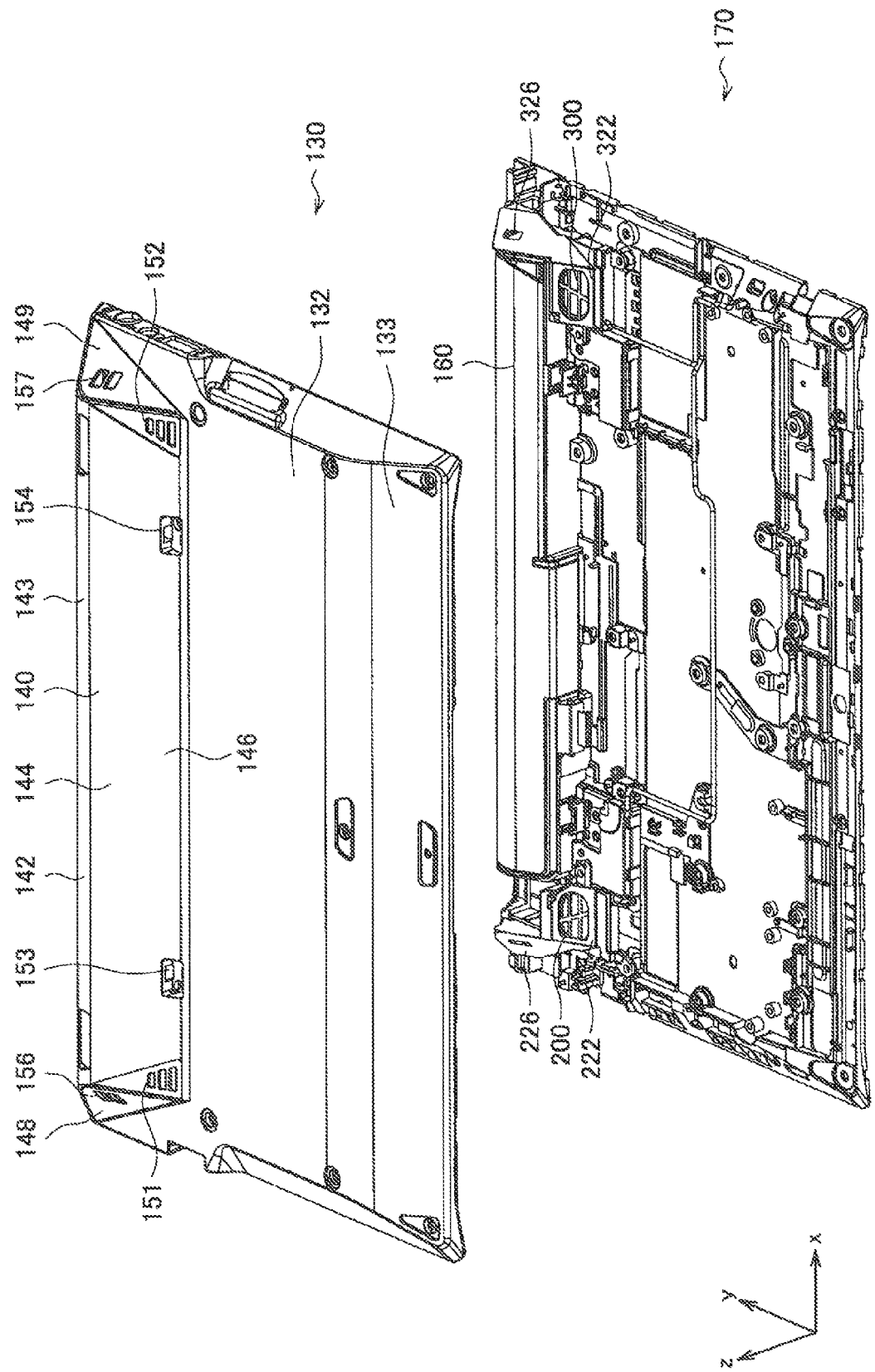
FIG. 10 is an exploded perspective view of the body cabinet 120.
Figure 11:
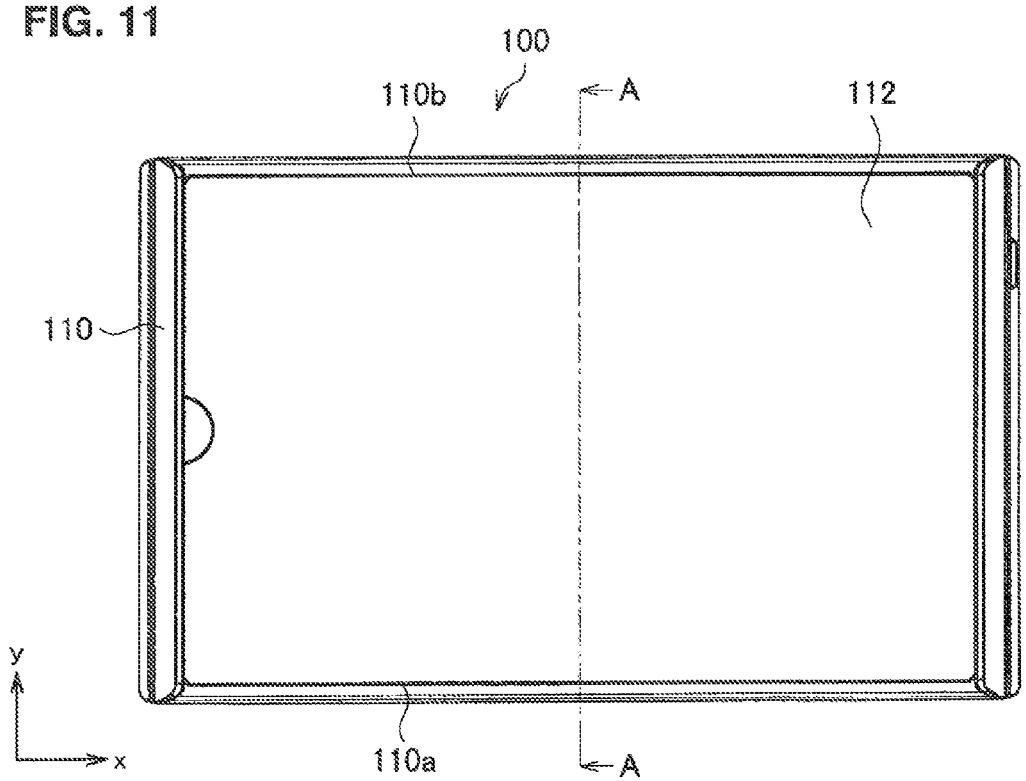
FIG. 11 is a plan view showing the electronic apparatus 100 in the default state.
Figure 12:
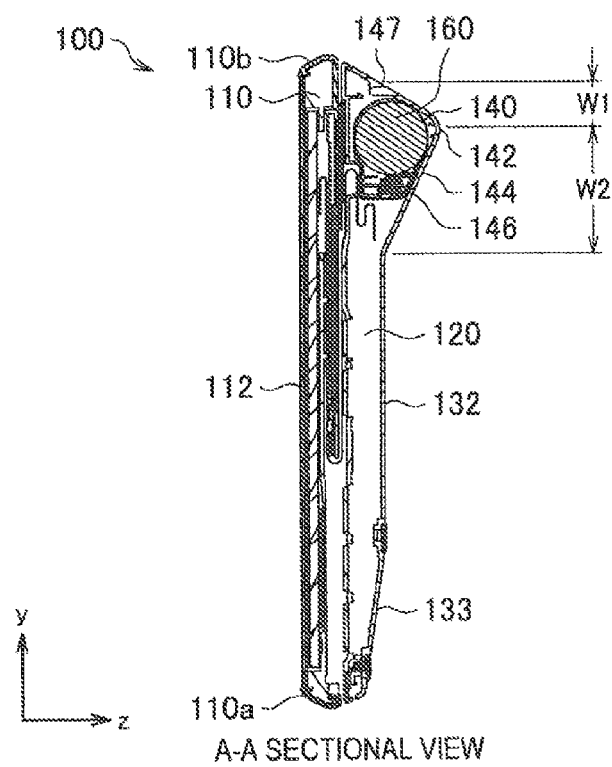
FIG. 12 is an A-A sectional view of FIG. 11.

A detailed configuration of the body cabinet 120 will be described with reference to FIGS. 9 to 12. FIG. 9 is a perspective view showing the bottom side of the body cabinet 120. FIG. 10 is an exploded perspective view of the body cabinet 120. FIG. 11 is a plan view showing the electronic apparatus 100 in the default state. FIG. 12 is an A-A sectional view of FIG. 11.

As shown in FIG. 10, the body cabinet 120 includes a bottom case 130 and a top case 170. The keyboard 122 and the uneven portion 126 described above are provided in the top case 170 (see FIG. 7).

The electronic apparatus 100 contains various electronic components inside the body cabinet 120. As shown in FIG. 10, a battery 160 and the speaker units 200, 300 are provided inside the body cabinet 120. The speaker unit 200 corresponds to a first speaker unit and the speaker unit 300 corresponds to a second speaker unit.

(The Battery 160)

The battery 160 is provided at the bottom side of the electronic apparatus 100 to supply electric power to the electronic apparatus 100. The battery 160 according to the present embodiment is a cylindrical battery whose shape is cylindrical. The cylindrical battery has a larger capacity of electric power per the same volume than a so-called polymer type rectangular battery or plane battery. For example, the capacity of the cylindrical battery is about 1.5 times the capacity of the rectangular battery.

As shown in FIG. 10, the battery 160 is arranged on the side of one end of the body cabinet 120 in the transverse direction (back side of the body cabinet 120). The battery 160 is arranged in such a way that the longitudinal direction of the battery 160 is along the longitudinal direction of the body cabinet 120. The battery 160 arranged as described above has a weight and thus, the center of gravity of the electronic apparatus 100 is positioned on the side of one end in the transverse direction. Incidentally, the longitudinal direction of the body cabinet 120 is the x direction in FIG. 10 and the transverse direction of the body cabinet 120 is the y direction in FIG. 10.

As shown in FIG. 12, a portion of the battery 160 protrudes to the outer side from the bottom 132 of the bottom case 130 in the thickness direction of the body cabinet 120. The portion protruding from the bottom 132 of the battery 160 is covered with the height 140 of the bottom case 130. As a portion of the battery 160 protrudes to the outer side from the bottom 132, the whole battery 160 may protrude to the outer side from the bottom 132.

(The Speaker Units 200, 300)

The speaker units 200, 300 emit a sound such as music. The sound emitted by the speaker units 200, 300 is transmitted to the outside via an opening of the height 140. That is, the sound radiated from the bottom of the electronic apparatus 100 is reflected by the mounting surface S (see FIG. 5) before being transmitted to the user. The speaker units 200, 300 according to the present embodiment are bass reflex speaker units that change the phase of a sound emitted from the back side of the speaker and use the resonance phenomenon for amplification of the bass.

As shown in FIG. 10, the speaker units 200, 300 are provided around the battery 160 inside the height 140. More specifically, the speaker unit 200 is provided around the battery 160 on the side of one end of the body cabinet 120 in the longitudinal direction and the speaker unit 300 is provided around the battery 160 on the side of the other end thereof in the longitudinal direction. Accordingly, a dead space inside the height 140 to cover the battery 160 can be used effectively and also the speaker can be made larger in size. A detailed configuration of the speaker units 200, 300 will be described later.

(The Height 140)

As shown in FIGS. 9 and 10, the body cabinet 120 includes the height 140 at the bottom 132 side of the bottom case 130. The height 140 is formed so as to protrude to the outer side from the bottom 132 to cover the battery 160 protruding from the bottom 132.

The height 140 is formed on the side of one end of the body cabinet 120 in the transverse direction (back side of the body cabinet 120). The height 140 is provided along the longitudinal direction of the body cabinet 120.

The sectional shape of the height 140 is, as shown in FIG. 12, substantially triangular. The height 140 includes a top portion 142 and an inclined portion 144. The top portion 142 includes, as shown in FIG. 9, a top surface 143 formed along the longitudinal direction of the body cabinet 120. The inclined portion 144 includes four inclined planes 146, 147, 148, 149 inclined from the bottom 132 toward the top portion 142 (more specifically, the top surface 143). Incidentally, the inclined plane 147 corresponds to a first inclined plane and the inclined plane 146 corresponds to a second inclined plane.

The inclined plane 146 is an inclined plane formed from the side of the other end of the bottom 132 in the transverse direction toward the top surface 143. The inclined plane 146 is a rectangular surface formed along the longitudinal direction of the body cabinet 120. Openings 151, 152 are formed on both sides of the inclined plane 146 in the longitudinal direction and at the bottom 132 side of the inclined plane.

The opening 151 is formed in a position opposite to the speaker unit 200. The opening 151 transmits a sound emitted by the speaker unit 200 to the outside. The opening 152 is formed in a position opposite to the speaker unit 300. The opening 152 transmits a sound emitted by the speaker unit 300 to the outside.

Engagement holes 153, 154 are formed in the longitudinal direction of the inclined plane 146 on the center side from the openings 151, 152 and at the bottom 132 side. The engagement hole 153 and the engagement hole 154 engage with a protective cover covering the height 140 and the display unit 112. Details of the protective cover will be described later.

The inclined plane 147 is an inclined plane formed from the side of one end of the bottom 132 in the transverse direction toward the top surface 143. The inclined plane 147 is a rectangular surface formed along the longitudinal direction of the body cabinet 120. The inclined plane 147 is provided with a connection port 155 (see FIG. 13) connected to a communication cable (not shown). The connection port 155 is provided in the dead space around the battery 160 in the height 140.

As shown in FIG. 12, the angle of inclination of the inclined plane 147 with respect to the bottom 132 is larger than the angle of inclination of the inclined plane 146 with respect to the bottom 132. The inclined planes 146, 147 are formed in such a way that a width W1 of the inclined plane 147 in the transverse direction is smaller than a width W2 of the inclined plane 146 in the transverse direction.

The inclined plane 148 is an inclined plane formed from the side of one end of the bottom 132 in the longitudinal direction toward the top surface 143. The inclined plane 148 is a rectangular surface formed along the transverse direction of the body cabinet 120. The inclined plane 148 has an opening 156 formed in a position opposite to the speaker unit 200. The opening 156 transmits a sound emitted from the back side by the speaker unit 200 to the outside.

The inclined plane 149 is an inclined plane formed from the side of the other end of the bottom 132 in the longitudinal direction toward the top surface 143. The inclined plane 149 is a rectangular surface formed along the transverse direction of the body cabinet 120. The inclined plane 149 has an opening 157 formed in a position opposite to the speaker unit 300. The opening 157 transmits a sound emitted from the back side by the speaker unit 300 to the outside.

When the electronic apparatus 100 is placed on the mounting surface S, the top portion 142 comes into contact with the mounting surface S, but the inclined portion 144 (the four inclined planes 146, 147, 148, 149) does not come into contact with the mounting surface S. That is, a space is formed between the inclined portion 144 and the mounting surface S and openings provided in the four inclined planes 146, 147, 148, 149 are not closed by the mounting surface S.

Incidentally, since the electronic apparatus 100 has a thin plane shape and the height 140 with the configuration as described above newly provided, the user can easily grip the electronic apparatus 100 with one hand when carrying the electronic apparatus 100 because the height 140 can easily be gripped. A more detailed description will be provided below using FIGS. 13 and 14.

Figure 13:
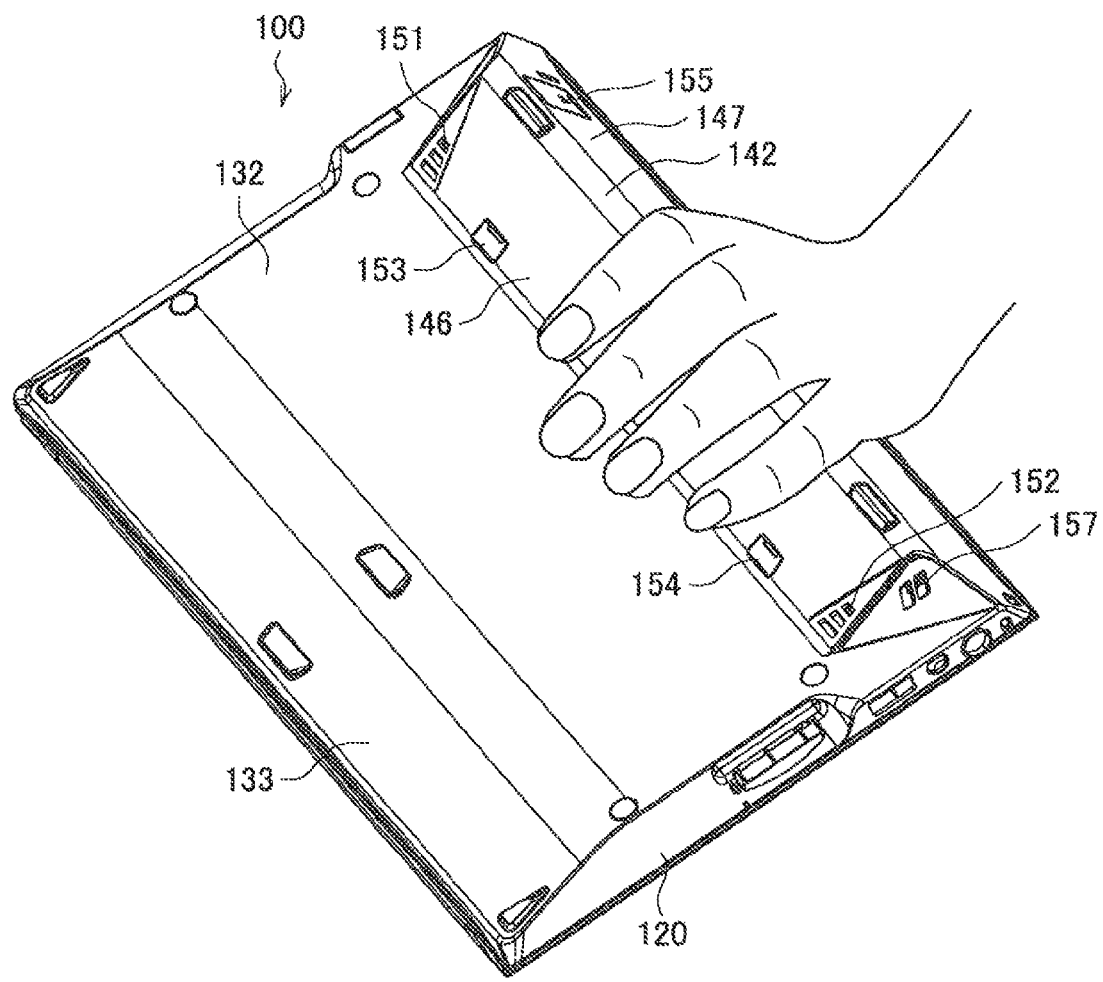
FIG. 13 is a perspective view showing how a user grips a height 140.
Figure 14:
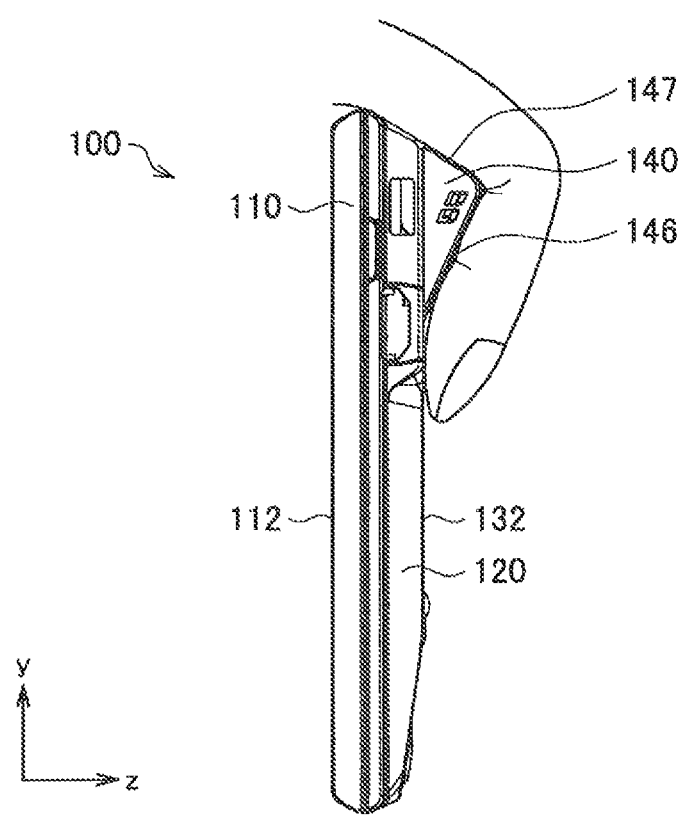
FIG. 14 is a side view showing how the user grips the height 140.

FIG. 13 is a perspective view showing how the user grips the height 140. FIG. 14 is a side view showing how the user grips the height 140. As shown in FIGS. 13 and 14, the user supports the height 140 of the body cabinet 120 with four fingers other than the thumb and supports the display cabinet 110 with the thumb. At this point, the four fingers supporting the inclined plane of the height 140 hook on the height 140, making gripping of the height 140 easier. Further, in the tilted state, not only the four fingers grip the height 140, but also the thumb grips the uneven portion 126 (FIG. 7). As a result, the user can easily grip the electronic apparatus 100 with one hand when carrying the electronic apparatus 100.

The battery 160 covered with the height 140 has a weight and thus, the center of gravity of the electronic apparatus 100 is positioned close to the height 140. Because gripping is stabilized (also felt lighter) by the height 140 close to the center of gravity being gripped by the user, the electronic apparatus 100 can be gripped with one hand and carried easily.

Further, as shown in FIG. 12, the inclined planes 146, 147 are formed in such a way that the width W1 of the inclined plane 147 in the transverse direction is smaller than the width W2 of the inclined plane 146 in the transverse direction. Thus, the fingertip supports only the inclined plane 146 in a longer region, stabilizing gripping of the height 140 still more.

<3. Detailed Configuration of Speaker Unit>

As shown in FIG. 10 described above, the electronic apparatus 100 includes the speaker unit 200 and the speaker unit 300 around the battery 160. A stereo sound can be emitted by providing two speaker units.

Figure 15:
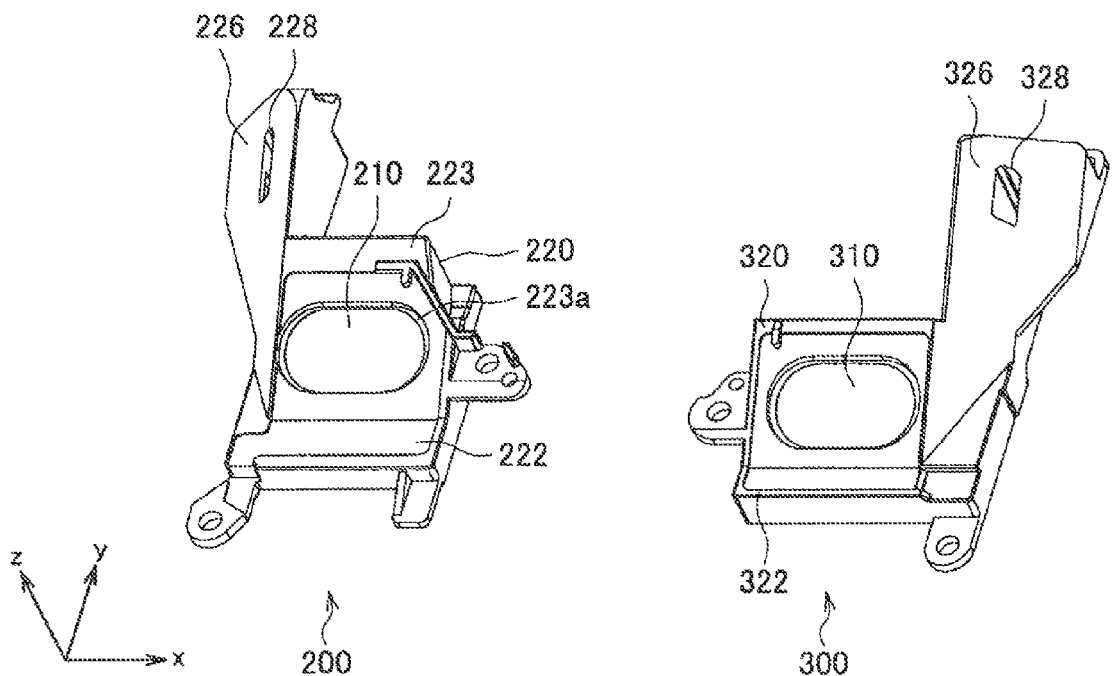
FIG. 15 is a perspective view showing speaker units 200, 300.

FIG. 15 is a perspective view showing the speaker units 200, 300. As shown in FIG. 15, the speaker units 200, 300 have similar configurations. Thus, the detailed configuration of the speaker unit 200 will be described below with reference to FIGS. 16 to 20.

Figure 16:
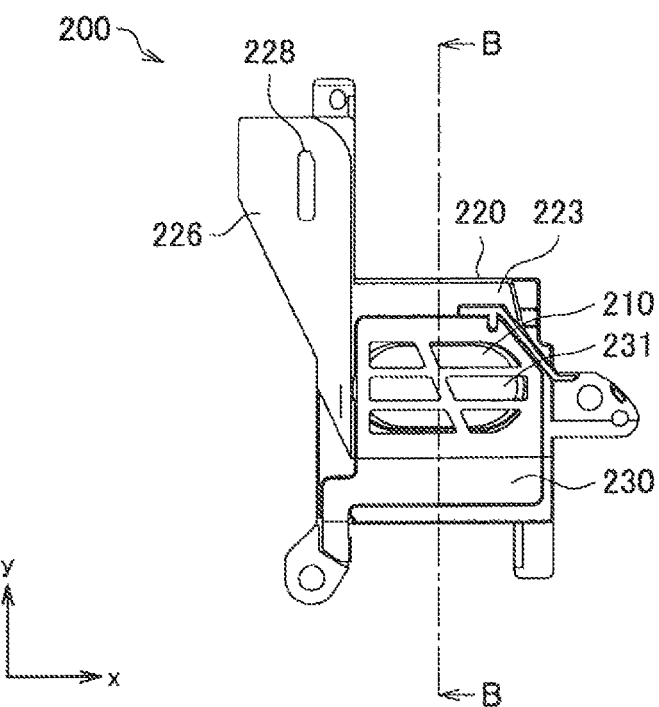
FIG. 16 is a plan view of the speaker unit 200.
Figure 17:
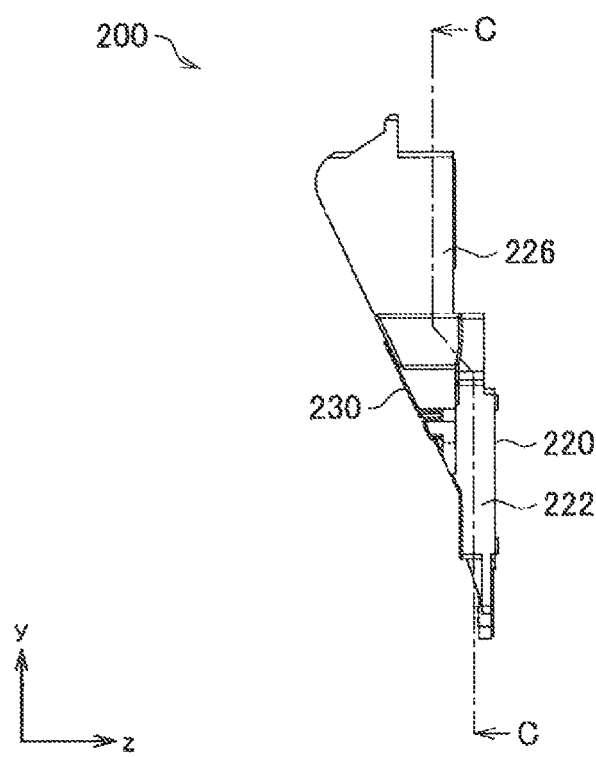
FIG. 17 is a side view of the speaker unit 200.
Figure 18:
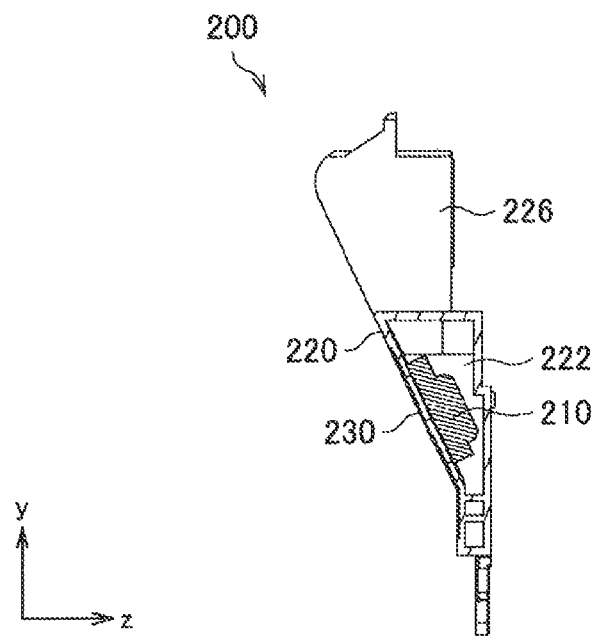
FIG. 18 is a B-B sectional view of FIG. 16.
Figure 19:
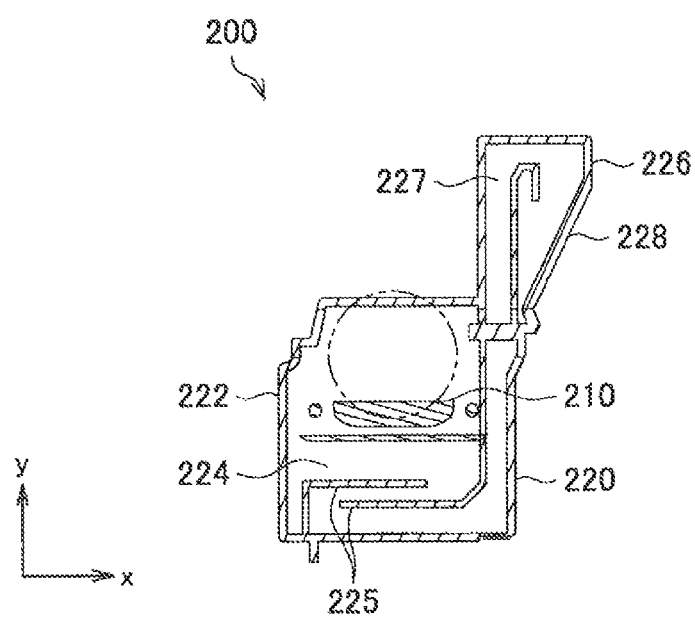
FIG. 19 is a C-C sectional view of FIG. 17.
Figure 20:
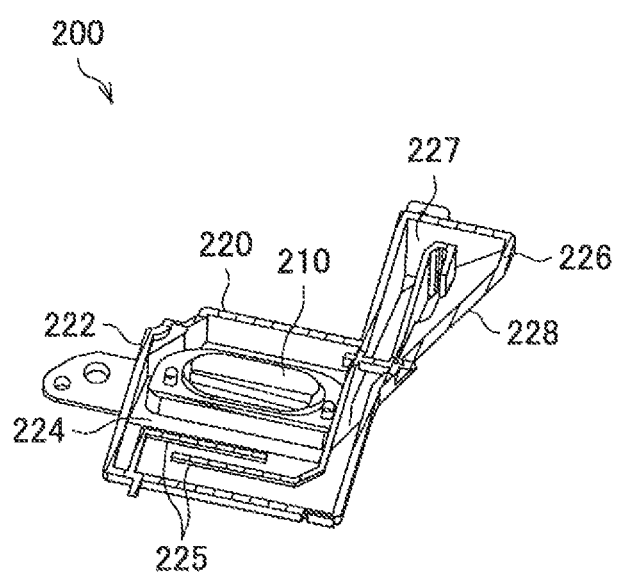
FIG. 20 is a perspective view showing an inner portion of the speaker unit 200.

FIG. 16 is a plan view of the speaker unit 200. FIG. 17 is a side view of the speaker unit 200. FIG. 18 is a B-B sectional view of FIG. 16. FIG. 19 is a C-C sectional view of FIG. 17. FIG. 20 is a perspective view showing an inner portion of the speaker unit 200.

As shown in FIGS. 15 and 16, the speaker unit 200 includes the speaker 210, a speaker unit cabinet 220, and a sheet metal 230. For convenience of description, the sheet metal 230 is not shown in FIG. 15.

The speaker 210 emits a sound such as music. As a property of a small speaker like the speaker 210, it is known that better sound quality and a high volume level can be obtained easily with an increasing size of the speaker 210. Thus, in the present embodiment, the speaker 210 is arranged around the battery 160 at the bottom 132 side of the body cabinet 120 so that the speaker 210 that is large in size can be used.

The speaker unit cabinet 220 is configured by combining, for example, two cases (upper and lower cases) so that a space is formed therein. The speaker unit cabinet 220 has an L shape and includes a body portion 222 and an extended portion 226.

As shown in FIG. 18, the body portion 222 has a space therein and contains the speaker 210. As shown in FIG. 15, a front surface 223 of the body portion 222 is formed as an inclined plane and the speaker 210 is provided so as to be parallel to the front surface 223. The front surface 223 has an opening 223a so that the speaker 210 is exposed.

As shown in FIG. 19, a path 224 through which a sound is transmitted is formed inside the body portion 222. The path 224 is like a maze with a wall 225 formed alternately. By changing the shape of the path 224 according to the above, the length of the transmission path of a sound can be adjusted.

As shown in FIG. 19, the extended portion 226 is formed so as to extend upward from the side surface of the speaker seat portion 222. The extended portion 226 includes a path 227 and an opening 228. The path 227 is linked to the path 224 of the body portion 222. A sound having passed through the path 224 and the path 227 is transmitted to the outside through the opening 228.

In the present embodiment, the length of path can be changed within a limited space by a maze-like path being configured by the path 224 and the path 227. Accordingly, the resonance frequency can be adjusted and enhancement of desired bass can be realized so that sound quality of the speaker units 200, 300 can be improved.

The sheet metal 230 has a function to prevent the speaker 210 from being destroyed by external static electricity. The sheet metal 230 covers the speaker 210 and the opening 223a of the body portion 222. The sheet metal 230 has a slit 231 in a portion thereof corresponding to the speaker 210.

The speaker units 200, 300 configured as described above are arranged, as shown in FIG. 10, around the battery 160 in the height 140. More specifically, the body portion 222 of the speaker unit 200 is arranged along the inclined plane 146 and the extended portion 226 is arranged along the inclined plane 148. A body portion 322 of the speaker unit 300 is arranged along the inclined plane 146 and an extended portion 326 is arranged along the inclined plane 149. That is, the body portions 222, 322 of the speaker units 200, 300 are arranged along the side surface of the battery 160 in the longitudinal direction and the extended portions 226, 326 are arranged along the side surface of the battery 160 in the transverse direction.

As described above, the height 140 covers the battery 160 and in the present embodiment, the speaker unit cabinet 220 is arranged in a space (dead space) between the height 140 and the battery 160. That is, according to the present embodiment, it is not necessary to provide a dedicated space for arrangement of the speaker units 200, 300 and the dead space of the height 140 can effectively be used.

The keyboard 122 is arranged on the front side of the body cabinet 120 and thus, only a small speaker can be arranged on the front side. In contrast, by arranging the speaker at the bottom of the body cabinet 120, the degree of freedom of arrangement can be increased and also a wide arrangement space can be secured. Particularly, the dead space of the height 140 can be used more effectively by arranging the body portions 222, 322 and the extended portions 226, 326 of the speaker units 200, 300 along different inclined planes.

Further, the battery 160 has a cylindrical shape and a dead space is likely to arise between the battery 160 and the height 140. Thus, a larger speaker can be arranged inside the height 140 covering the battery 160 in the cylindrical shape. Moreover, the space on the back side of the speaker effective for the improvement of the sound quality can be widened by inclined arrangement of the speaker along the inclined plane, leading to improved volume and sound quality.

In the above embodiment, the speaker unit cabinet 220 containing the speaker 210 and having the transmission path of a sound internally is arranged inside the height 140, but the present embodiment is not limited to such an example. For example, the speaker 210 that is not contained in the speaker unit cabinet may be arranged inside the body cabinet 120 to form the transmission path (space) of a sound by the bottom case 130 and the top case 170 constituting the body cabinet 120. In such a case, the speaker unit cabinet 220 is no longer necessary and a space to arrange the speaker and a space on the back side of the speaker can further be secured, allowing the speaker to be larger.

Figure 21:
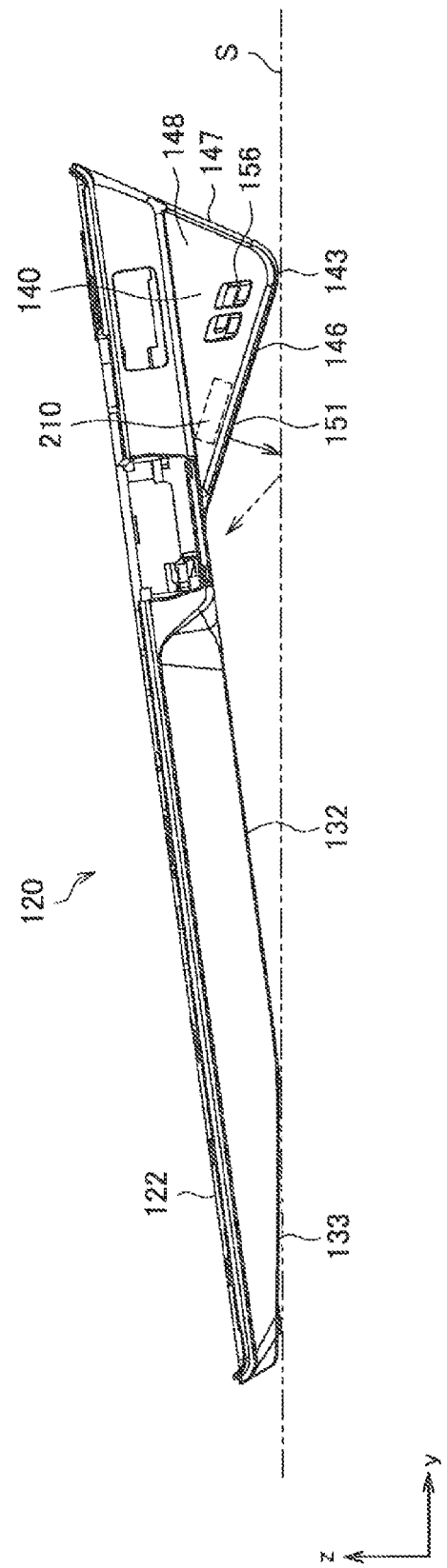
FIG. 21 is a diagram illustrating a transmission path of a sound emitted from a speaker 210.

The transmission path of a sound emitted from the speaker units 200, 300 of the electronic apparatus 100 placed on the mounting surface S will be described with reference to FIG. 21. FIG. 21 is a diagram illustrating a transmission path of a sound emitted from the speaker 210. For convenience of description, the display cabinet 110 is omitted in FIG. 21. The electronic apparatus 100 in FIG. 21 may be in any of the default state and the tilted state. That is, the speaker units 200, 300 provided at the bottom of the body cabinet 120 can transmits a sound to the user regardless of the state of the electronic apparatus 100.

When, as shown in FIG. 21, the electronic apparatus 100 is placed on the mounting surface S, the end 133 of the bottom 132 and the top surface 143 of the height 140 come into contact with the mounting surface S and a portion (such as the inclined plane 146) between the end 133 of the body cabinet 120 in the longitudinal direction and the top surface 143 do not come into contact with the mounting surface S. Thus, a space in which a sound vibrates is formed between the openings 151, 152 of the inclined plane 146 and the mounting surface S.

Then, a sound emitted by the speaker units 200, 300 (a sound emitted by the speaker 210 of the speaker unit 200 is taken as an example for the description) is radiated, as shown in FIG. 21, from the opening 151 of the inclined plane 146 of the height 140 toward the space. Then, the sound radiated to the outside of the electronic apparatus 100 is reflected by the mounting surface S before being transmitted to the user facing the electronic apparatus 100. A sound from the back of the speaker is radiated from the opening 156 of the inclined plane 148 of the height 140 and transmitted to the user.

Thus, according to the present embodiment, even if the electronic apparatus 100 having the speaker units 200, 300 at the bottom 132 of the cabinet is placed on the mounting surface S, the openings 151, 152 through which a sound is radiated to the outside are not closed by the mounting surface S. Thus, the user can listen to a sound emitted from the speaker units 200, 300 in high quality at high-volume level.

<4. Protective Cover>

As shown in FIG. 1, the display unit 112 according to the present embodiment is exposed to the outside in the default state of the electronic apparatus 100. In a state in which the display unit 112 is exposed to the outside, the display surface of the display unit 112 may be damaged when, for example, the electronic apparatus 100 in the default state is carried. Thus, the electronic apparatus 100 according to the present embodiment includes a protective cover that protects the display unit 112 to prevent the display surface of the display unit 112 from being damaged.

Figure 22:
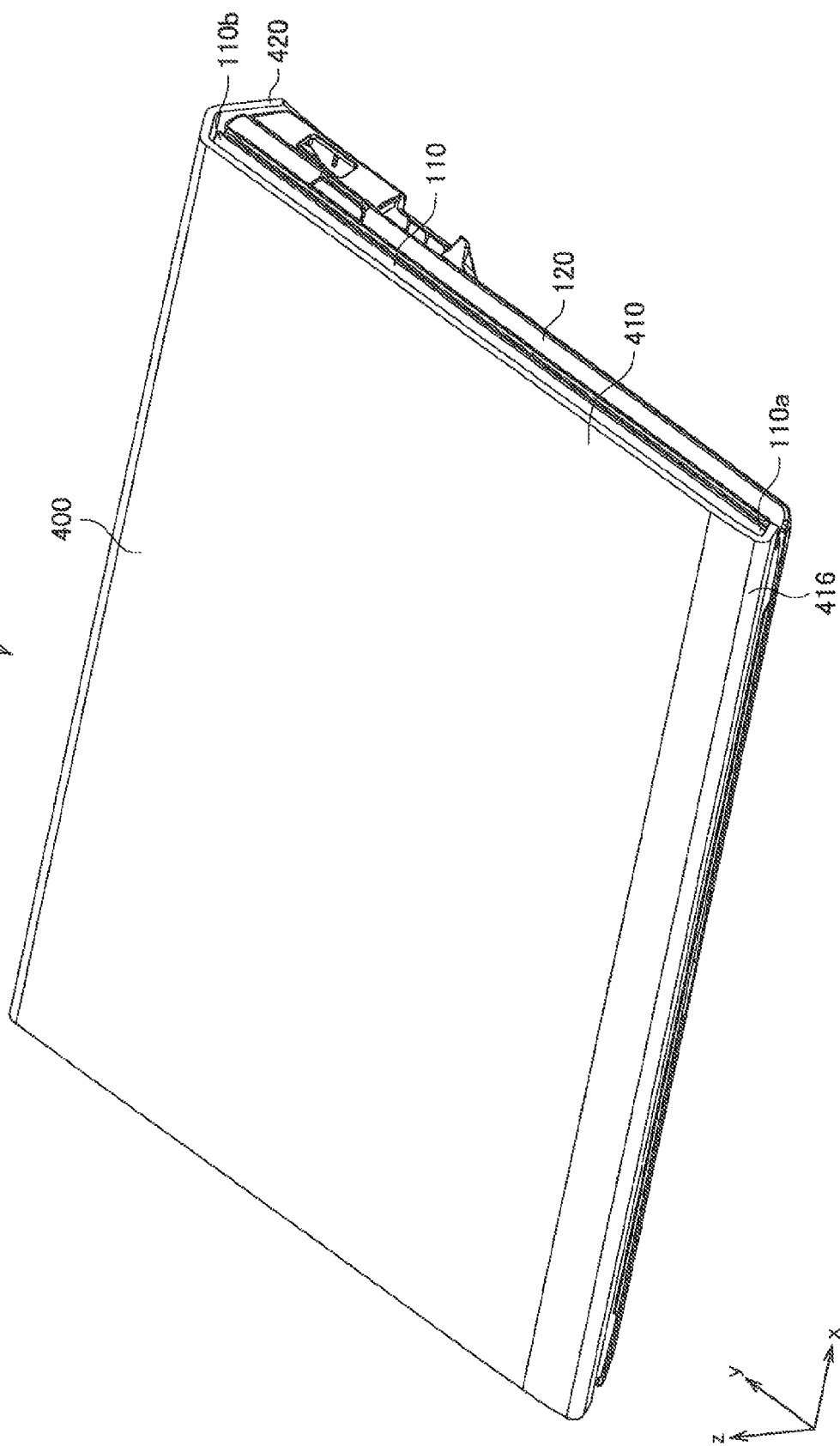
FIG. 22 is a perspective view when the electronic apparatus 100 in the default state mounted with a protective cover 400 is viewed from a top side.
Figure 23:
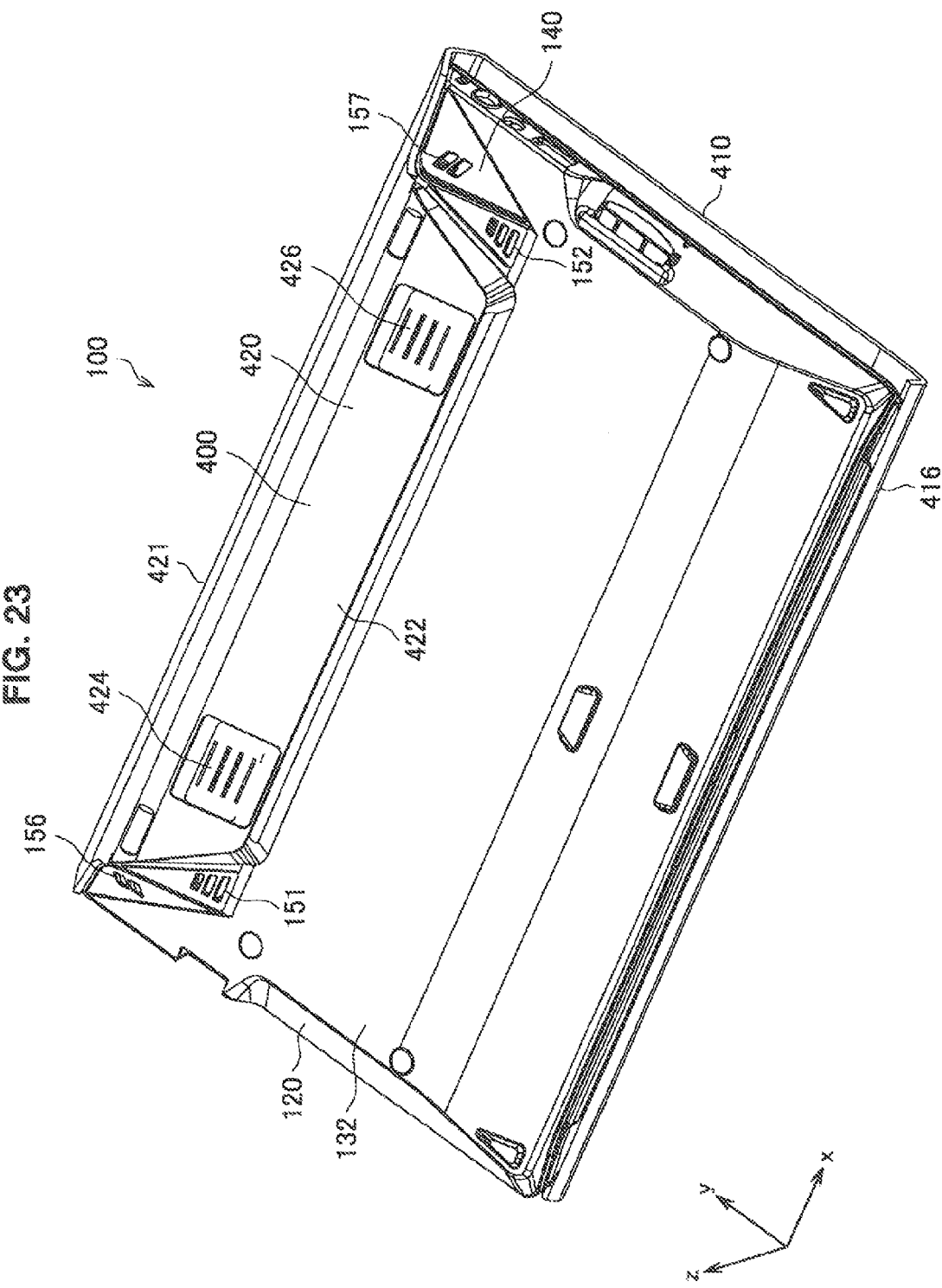
FIG. 23 is a perspective view when the electronic apparatus 100 in the default state mounted with the protective cover 400 is viewed from a bottom side.
Figure 24:
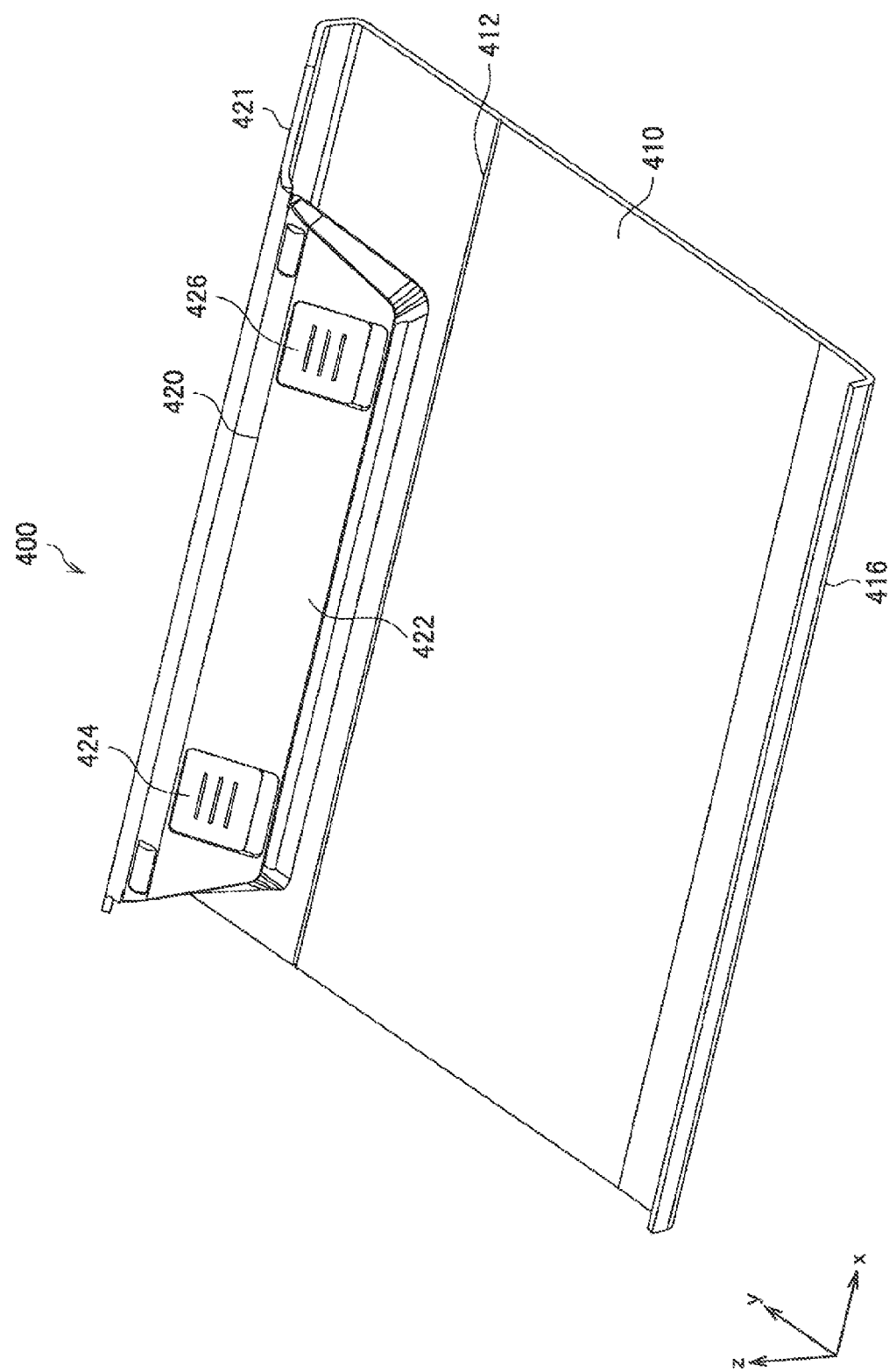
FIG. 24 is a perspective view showing the protective cover 400.
Figure 25:
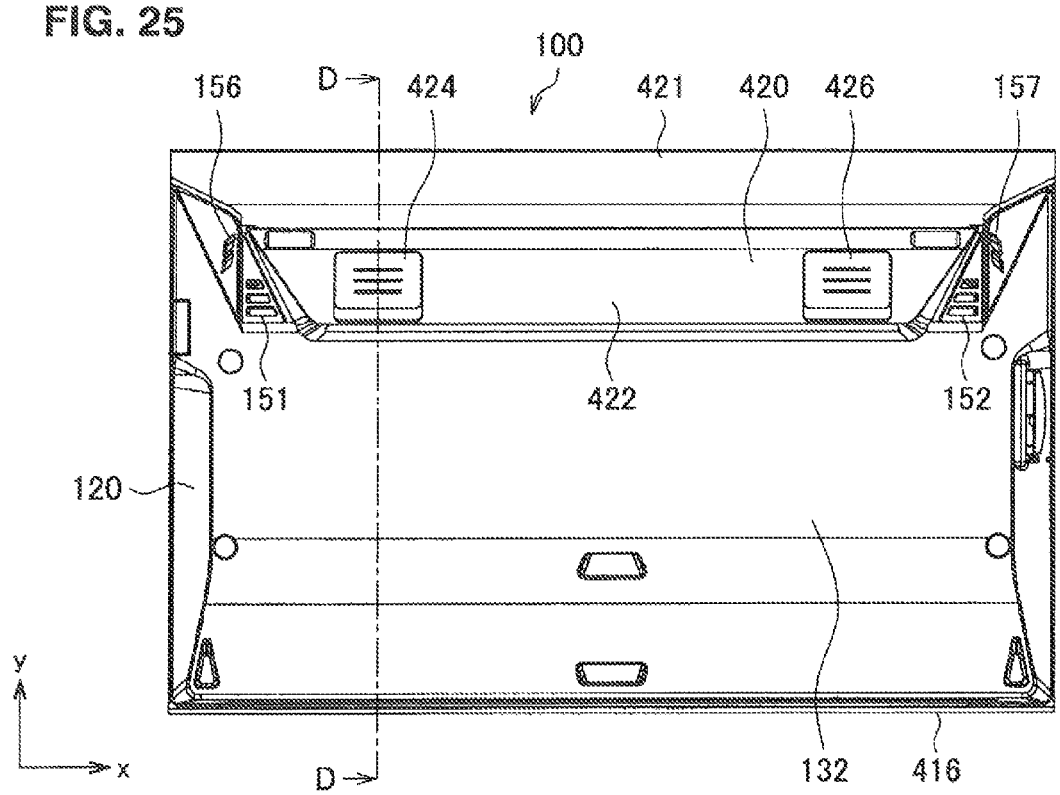
FIG. 25 is a bottom view of the electronic apparatus 100 in the default state mounted with the protective cover 400.
Figure 26:
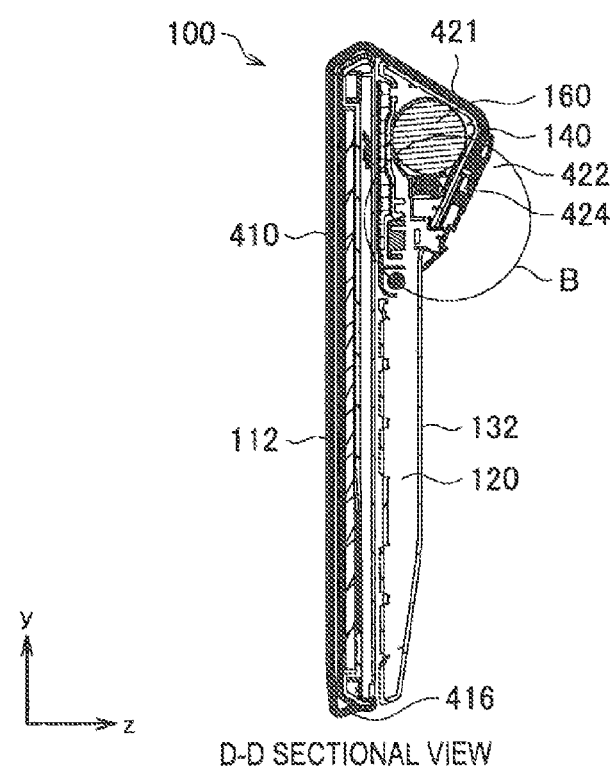
FIG. 26 is a D-D sectional view of FIG. 25.
Figure 27:
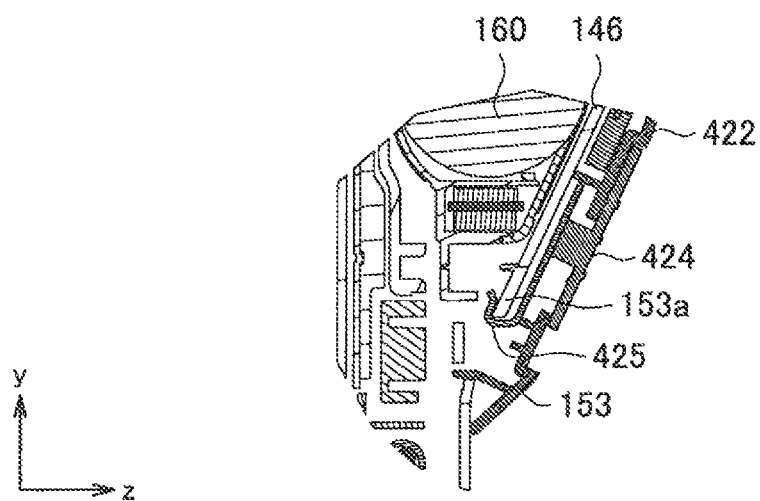
FIG. 27 is an enlarged view enlarging a portion B in FIG. 26.

The configuration of the protective cover 400 will be described below with reference to FIGS. 22 to 27. FIG. 22 is a perspective view when the electronic apparatus 100 in the default state mounted with the protective cover 400 is viewed from the top side. FIG. 23 is a perspective view when the electronic apparatus 100 in the default state mounted with the protective cover 400 is viewed from the bottom side. FIG. 24 is a perspective view showing the protective cover 400. FIG. 25 is a bottom view of the electronic apparatus 100 in the default state mounted with the protective cover 400. FIG. 26 is a D-D sectional view of FIG. 25. FIG. 27 is an enlarged view enlarging a portion B in FIG. 26.

As shown in FIGS. 22 and 23, the protective cover 400 is engaged with the height 140 of the electronic apparatus 100 in the default state to cover the display unit 112. Accordingly, the protective cover 400 protects the display unit 112 of the electronic apparatus 100 in the default state.

The protective cover 400 is formed from, for example, resin and the thickness thereof is approximately uniform. As shown in FIG. 24, the protective cover 400 includes a base 410, a locking portion 416, and a bending portion 420.

The base 410 has a plane shape and is as large as the display cabinet 110. As shown in FIG. 22, the base 410 covers the whole display cabinet 110 of the electronic apparatus 100 in the default state. When the display cabinet 110 is covered, the base 410 is opposed to the display unit 112 with a slight gap therebetween. Accordingly, the display unit 112 can be prevented from being damaged by the base 410 being brought into contact with the display unit 112.

The locking portion 416 is a portion extending in a direction perpendicular to the base 410. As shown in FIG. 22, the locking portion 416 is locked to one end 110a of the display cabinet 110 in the transverse direction. Accordingly, the position of the base 410 covering the display cabinet 110 with respect to the display unit 112 can be prevented from being shifted.

The bending portion 420 is a portion extending from the base 410 in an L shape. As shown in FIG. 26, the bending portion 420 covers the height 140 when the protective cover 400 is mounted on the electronic apparatus 100. The bending portion 420 includes a first bending portion 421 and a second bending portion 422.

The first bending portion 421 is a portion linked to an end of the base 410. As shown in FIG. 23, the first bending portion 421 is in contact with the inclined plane 147 of the height 140 when the protective cover 400 is mounted on the electronic apparatus 100.

As shown in FIG. 23, the second bending portion 422 is in contact with the inclined plane 146 of the height 140 when the protective cover 400 is mounted on the electronic apparatus 100. The width of the second bending portion 422 is smaller than the width of the first bending portion 421 so that when the protective cover 400 is mounted on the electronic apparatus 100, the openings 151, 152 of the height 140 are not closed. Accordingly, the user can hear a sound emitted from the speaker units 200, 300 even while the protective cover 400 is mounted.

The second bending portion 422 includes engagement portions 424, 426 engaged with the height 140 on both sides thereof. The engagement portion 424 is engaged with an engagement hole 153 (see FIG. 9) of the height 140 and the engagement portion 426 is engaged with an engagement hole 154 (see FIG. 9) of the height 140.

The engagement portion 424 is a slide member that can slide between a retreat position and a lock position by a user's operation. When the protective cover 400 is removed from the electronic apparatus 100, the engagement portion 424 is located in the retreat position and when the protective cover 400 is mounted on the electronic apparatus 100, the engagement portion 424 is located in the lock position shown in FIG. 24.

The engagement portion 424 includes, as shown in FIG. 27, a hook 425. The hook 425 moves together with sliding of the engagement portion 424. As shown in FIG. 27, when the engagement portion 424 is located in the lock position, the engagement portion 424 and the engagement hole 153 are engaged by the hook 425 being locked to an edge 153a of the engagement hole 153.

Like the engagement portion 424, the engagement portion 426 is also a slide member that can slide between the retreat position and the lock position. The engagement portion 426 includes a hook (not shown) and is engaged with the engagement hole 154 by the hook being locked to an edge of the engagement hole 154.

The engagement portions 424, 426 described above can prevent the protective cover 400 from being separated when the electronic apparatus 100 mounted with the protective cover 400 is carried. In the foregoing, it is assumed that the two engagement portions 424, 426 are provided, but the present embodiment is not limited to such an example and the number of engagement portions may be only one or three or more.

Figure 28:
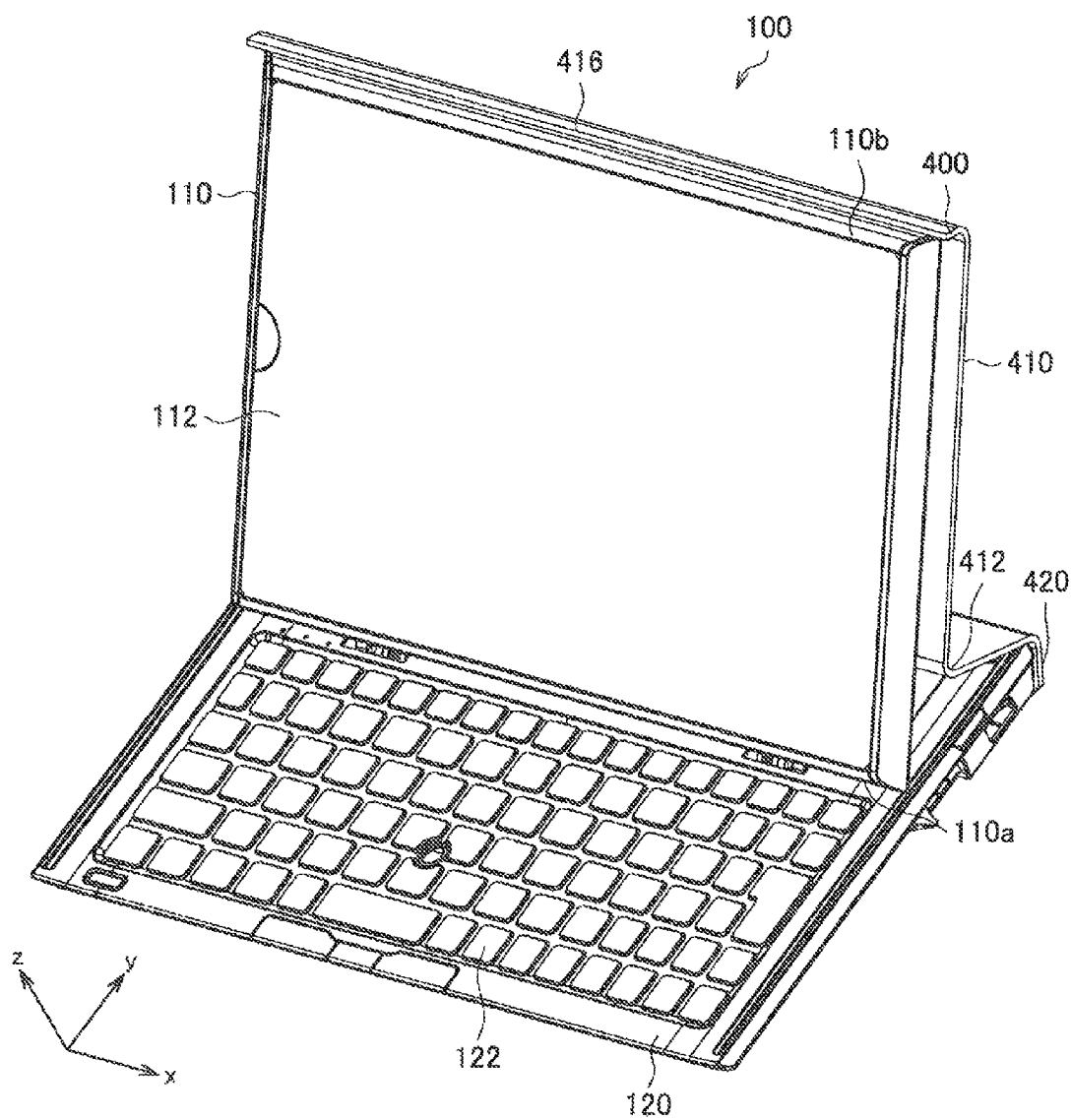
FIG. 28 is a perspective view when the electronic apparatus 100 in the tilted state mounted with the protective cover 400 is viewed from the top side.
Figure 29:
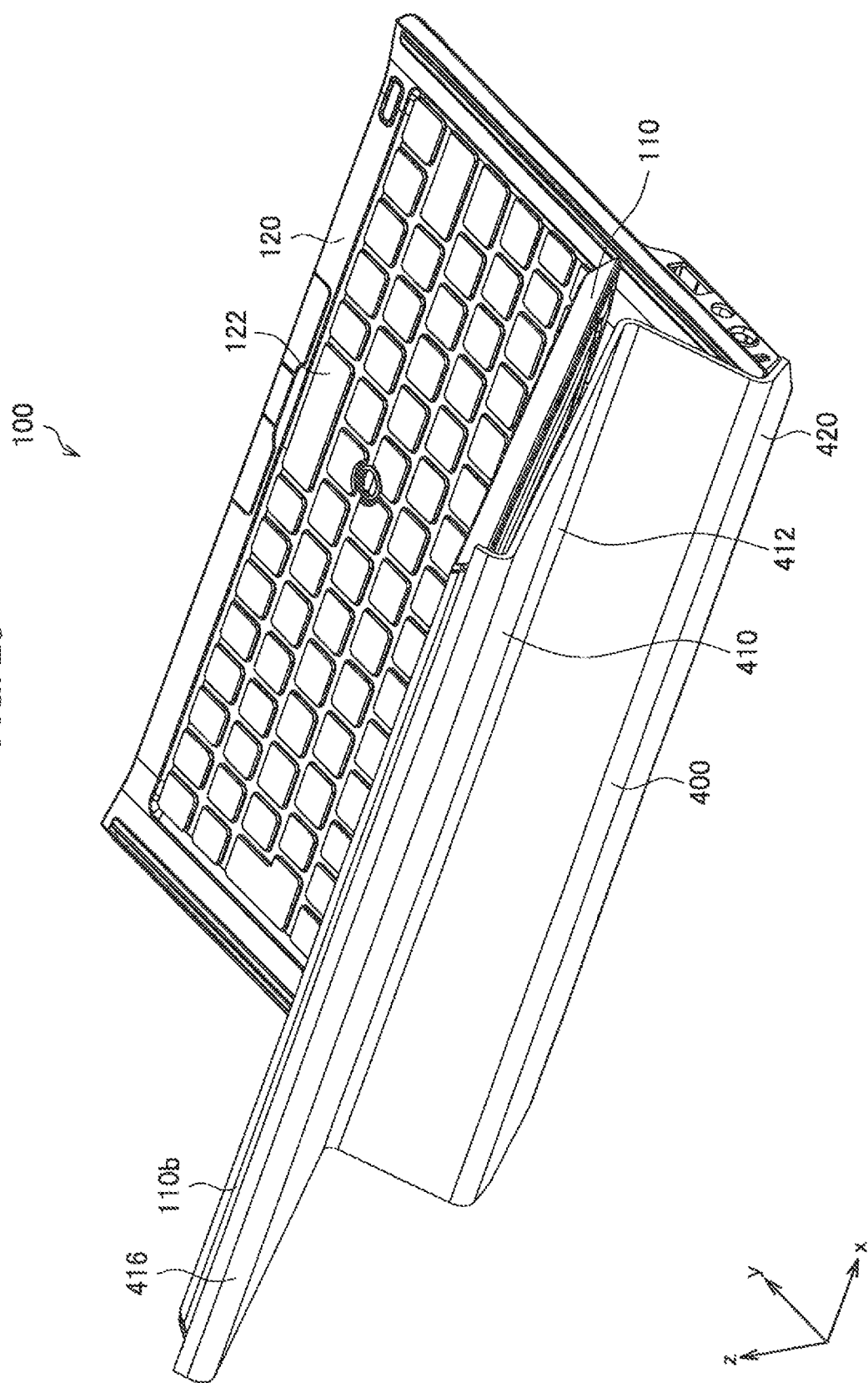
FIG. 29 is a perspective view when the electronic apparatus 100 in the tilted state mounted with the protective cover 400 is viewed from the bottom side.

In the foregoing, the present embodiment has been described by taking a case when the protective cover 400 is mounted on the electronic apparatus 100 in the default state as an example, but as shown in FIGS. 28 and 29, the protective cover 400 can be mounted on the electronic apparatus 100 in the tilted state.

FIG. 28 is a perspective view when the electronic apparatus 100 in the tilted state mounted with the protective cover 400 is viewed from the top side. FIG. 29 is a perspective view when the electronic apparatus 100 in the tilted state mounted with the protective cover 400 is viewed from the bottom side.

When the electronic apparatus 100 is in the default state, as shown in FIG. 22 described above, the locking portion 416 of the protective cover 400 is locked to the one end 110a of the display cabinet 110 in the transverse direction. In contrast, when the electronic apparatus 100 is in the tilted state, as shown in FIG. 28, the locking portion 416 is locked to another end 110b of the display cabinet 110 in the transverse direction. When the electronic apparatus 100 is in the tilted state, in contrast to the default state, a flexion portion 412 of the protective cover 400 is bent.

According to the above configuration, it is not necessary to remove the protective cover 400 from the electronic apparatus 100 even when the electronic apparatus 100 in the default state mounted with the protective cover 400 changes to the tilted state. Thus, time and efforts to mount the protective cover 400 on the electronic apparatus 100 can be saved when the electronic apparatus 100 in the tilted state mounted with the protective cover 400 changes to the default state, improving the convenience for users.

Moreover, when compared with the state shown in FIG. 7, mechanisms on the back side of the display cabinet 110 can be prevented from being exposed to the outside by mounting the protective cover 400 on the electronic apparatus 100 in the tilted state, providing also advantages in terms of design. Furthermore, components or the like can be prevented from erroneously entering a gap between the back side of the display cabinet 110 and the body cabinet 120 by the protective cover 400.

<5. Conclusion>

As shown in FIG. 12 described above, the electronic apparatus 100 according to the present embodiment includes the battery 160 provided at the bottom 132 side on the opposite side of the display unit 112 in the cabinet of the electronic apparatus 100 and at least a portion of the battery protruding to the outer side from the bottom 132 and the height 140 formed at an edge of the body cabinet 120 so as to protrude to the outer side from the bottom 132 to cover the battery 160.

According to such a configuration, by providing the height 140, as shown in FIG. 13, four fingers along the inclined plane of the height 140 hook on the height 140 when an edge of the body cabinet 120 is gripped even if the electronic apparatus 100 has a plane shape. Thus, it becomes easier for the user to grip the height 140 and, as a result, the user can easily grip the electronic apparatus 100 with one hand when carrying the electronic apparatus 100.

The battery 160 covered with the height 140 has a weight and thus, the center of gravity of the electronic apparatus 100 is a position close to the height 140 on an edge side of the electronic apparatus 100. Thus, when the user grips an edge of the body cabinet 120, gripping can be made more stable by gripping the height 140 to which the center of gravity is close. As a result, the user can carry the electronic apparatus 100 easily by gripping the electronic apparatus 100 with one hand.

It should be understood by those skilled in the art that various modifications, combinations, sub-combinations and alterations may occur depending on design requirements and other factors insofar as they are within the scope of the appended claims or the equivalents thereof.

In the above embodiment, an electronic apparatus is described by taking the electronic apparatus 100 having a cabinet including the display cabinet 110 and the body cabinet 120 as an example, but the electronic apparatus is not limited to such an example. For example, the electronic apparatus may be a tablet formed of one cabinet. The electronic apparatus may also be a PDA, game machine, electronic dictionary, or mobile phone as long as it has a battery at the bottom side of the cabinet.

In the above embodiment, it is assumed that the display cabinet 110 of the electronic apparatus 100 is configured so that the display cabinet 110 is tilted with respect to the body cabinet 120, but the present embodiment is not limited to such an example. For example, the display cabinet 110 and the body cabinet 120 may be configured as a foldable clam shell type, that is, the display unit 112 is exposed in an open state and the display unit 112 is covered with the body cabinet 120 in the closed state.

In the above embodiment, the sectional shape of the height 140 is assumed to be triangular, but the sectional shape is not limited to such an example. For example, the sectional shape of the height 140 may be semicircular or rectangular.

In the above embodiment, the electronic apparatus 100 is assumed to have the two speaker units 200, 300 (that is, stereo speakers), but the number thereof is not limited to two. For example, there may be only one speaker (monophonic speaker) or three speakers or more.

In the above embodiment, the battery 160 is assumed to be a cylindrical battery, but the battery 160 is not limited to such an example. For example, the battery 160 may be a battery of various shapes such as a rectangular battery and plane battery.

Additionally, the present technology may also be configured as below.

(1) An electronic apparatus, comprising:
 a cabinet having a display surface exposed to an outside;
 a battery provided at the bottom on an opposite side of the display surface in the cabinet and at least a portion of the battery protruding to an outer side from the bottom; and
 a height formed at the edge of the cabinet so as to protrude to the outer side to cover the battery.

(2) The electronic apparatus according to (1),
wherein the height is provided on the side of one end of the cabinet in a transverse direction along a longitudinal direction of the cabinet.

(3) The electronic apparatus according to (2),
wherein the height includes a top portion and an inclined portion in which an inclined plane is formed from the bottom toward the top portion.

(4) The electronic apparatus according to (3),
wherein the inclined portion includes:
a first inclined plane formed from the side of the one end of the bottom in the transverse direction toward the top portion; and
a second inclined plane formed from the side of the other end of the bottom in the transverse direction toward the top portion, and
a width of the first inclined plane in the transverse direction is smaller than the width of the second inclined plane in the transverse direction.

(5) The electronic apparatus according to any one of (1) to (4),
wherein a shape of the battery is cylindrical and a longitudinal direction of the battery is along the longitudinal direction of the cabinet.

(6) The electronic apparatus according to any one of (1) to (5), further comprising:
a speaker unit provided around the battery inside the height to emit a sound from the bottom.

(7) The electronic apparatus according to any one of (1) to (6), further comprising:
a connection port provided around the battery inside the height to connect to a communication cable.

(8) The electronic apparatus according to any one of (1) to (7), further comprising:
a touch panel for an input operation provided by being superimposed on the display surface.

(9) The electronic apparatus according to any one of (1) to (8), further comprising:
a protective cover engaged with the height to cover the height and the display surface.

(10) The electronic apparatus according to any one of (1) to (9),
wherein the cabinet includes:
a first cabinet that contains an input portion and in which the battery and the height are provided; and
a second cabinet that contains the display surface and can move with respect to the first cabinet.

(11) The electronic apparatus according to (10),
wherein the input portion is a keyboard having a plurality of keys, and
the second cabinet makes a transition between an initial state in which the keyboard is covered by overlapping with the first cabinet, a slide state in which the keyboard is exposed by sliding with respect to the first cabinet from the initial state, and a tilted state in which the second cabinet is tilted with respect to the first cabinet from the slide state.

The present disclosure contains subject matter related to that disclosed in Japanese Priority Patent Application JP 2011-95789 filed in the Japan Patent Office on Apr. 22, 2011, the entire content of which is hereby incorporated by reference.

What is claimed is:

1. An electronic apparatus, comprising:
a cabinet comprising a display surface exposed to an outside and a body comprising a keyboard, wherein the display surface and the body are slidably engaged with each other;
a battery provided at a bottom of the body on an opposite side of the display surface, at least a portion of the battery protruding to an outer side from the bottom;
a protrusion formed at an edge of the cabinet so as to protrude to the outer side to cover the battery; and
a protective cover comprising an engagement portion with a hook, wherein the hook engages the engagement portion and the protrusion with each other.

2. The electronic apparatus according to claim 1, wherein the protrusion is provided on a side of one end of the cabinet in a transverse direction along a longitudinal direction of the cabinet.

3. The electronic apparatus according to claim 2, wherein the protrusion comprises a top portion and an inclined portion in which an inclined plane is formed from the bottom toward the top portion.

4. The electronic apparatus according to claim 3, wherein the inclined portion comprises:
a first inclined plane formed from the side of the one end of the cabinet in the transverse direction toward the top portion; and
a second inclined plane formed from the side of the other end of the cabinet in the transverse direction toward the top portion, wherein a width of the first inclined plane in the transverse direction is smaller than the width of the second inclined plane in the transverse direction.

5. The electronic apparatus according to claim 1, wherein a shape of the battery is cylindrical and a longitudinal direction of the battery is along the longitudinal direction of the cabinet.

6. The electronic apparatus according to claim 1, further comprising: a speaker unit provided around the battery inside the protrusion to emit a sound.

7. The electronic apparatus according to claim 1, further comprising: a connection port provided around the battery inside the protrusion to connect to a communication cable.

8. The electronic apparatus according to claim 1, further comprising: a touch panel for an input operation provided by being superimposed on the display surface.

9. The electronic apparatus according to claim 1, wherein the protective cover is engaged with the protrusion to cover the protrusion and the display surface.

10. The electronic apparatus according to claim 1, wherein the cabinet comprises:
a first cabinet that contains an input portion and in which the battery and the protrusion are provided; and
a second cabinet that contains the display surface and can move with respect to the first cabinet.

11. The electronic apparatus according to claim 10, wherein the input portion is a keyboard having a plurality of keys, and wherein the second cabinet makes a transition between an initial state in which the keyboard is covered by overlapping with the second cabinet, a slide state in which the keyboard is exposed by sliding the second cabinet with respect to the first cabinet from the initial state, and a tilted state in which the second cabinet is tilted with respect to the first cabinet from the slide state.

12. The electronic apparatus according to claim 1, further comprising an uneven portion in the body operable to hold the electronic apparatus.

13. The electronic apparatus according to claim 1, wherein the protrusion comprises a top portion and an inclined portion in which an inclined plane is formed from the bottom toward the top portion, and wherein a plurality of engagement holes are formed in a longitudinal direction of the inclined portion.

14. An electronic apparatus, comprising:
a cabinet comprising a display cabinet and a body cabinet comprising a keyboard, wherein the display cabinet and the body cabinet are slidably engaged with each other;
an uneven portion provided on a back side of the body cabinet;
a battery provided at a bottom of the body cabinet on an opposite side of the display cabinet, at least a portion of the battery protruding to an outer side from the bottom;
a protrusion formed at an edge of the body cabinet so as to protrude to the outer side to cover the battery and;
a protective cover comprising an engagement portion with a hook, wherein the hook engages the engagement portion of the protective cover and the protrusion with each other.

* * * * *